US009799301B2

(12) United States Patent
Sahin

(10) Patent No.: US 9,799,301 B2
(45) Date of Patent: Oct. 24, 2017

(54) METHOD, SYSTEM, AND APPARATUS FOR BATTERY LIFE EXTENSION AND PERIPHERAL EXPANSION OF A WEARABLE DATA COLLECTION DEVICE

(71) Applicant: Nedim T. Sahin, Boston, MA (US)

(72) Inventor: Nedim T. Sahin, Boston, MA (US)

( * ) Notice: Subject to any disclaimer, the term of this patent is extended or adjusted under 35 U.S.C. 154(b) by 0 days.

(21) Appl. No.: 14/880,190

(22) Filed: Oct. 9, 2015

(65) Prior Publication Data

US 2016/0104451 A1 Apr. 14, 2016

Related U.S. Application Data

(60) Provisional application No. 62/062,077, filed on Oct. 9, 2014, provisional application No. 62/152,316, filed on Apr. 24, 2015.

(51) Int. Cl.
*G02B 27/01* (2006.01)
*G09G 5/00* (2006.01)
(Continued)

(52) U.S. Cl.
CPC .......... *G09G 5/006* (2013.01); *G02B 27/017* (2013.01); *G06F 1/163* (2013.01); *G06F 1/266* (2013.01); *G06F 1/28* (2013.01); *G06F 1/329* (2013.01); *G06F 3/012* (2013.01); *G06F 3/013* (2013.01); *G06F 3/0346* (2013.01); *G09G 3/001* (2013.01); *G09G 3/002* (2013.01); *G09G 3/003* (2013.01); *G02B 2027/0178* (2013.01); *G09G 2330/021* (2013.01); *G09G 2370/16* (2013.01)

(58) Field of Classification Search
None
See application file for complete search history.

(56) References Cited

U.S. PATENT DOCUMENTS 6,524,237 B1 * 2/2003 McGowan ............... G02B 6/04
348/E7.087
6,700,557 B1 * 3/2004 McKnight ......... G02F 1/134309
345/1.1
(Continued)

OTHER PUBLICATIONS

International Search Report and Written Opinion with Search History issued Jan. 10, 2017 in PCT/US16/56312 filed Oct. 10, 2016.

*Primary Examiner* — Joni Richer
(74) *Attorney, Agent, or Firm* — Gardella Grace P.A.

(57) ABSTRACT

An apparatus for providing an external power supply, memory device, camera, and/or other peripheral capabilities to a head-mounted data collection device may include a first portion releasably connecting to the data collection device. The first portion may have a first data port interface configured for connection to a corresponding data port interface of the data collection device. The apparatus may have a second portion releasably connectable to the first portion, the second portion including an internal data port interface configured for connection to a corresponding internal data port interface of the first portion, a power cell module, and a power supply interface configured for connection to a corresponding power supply input of the head-mounted wearable data collection device. The first portion and/or the second portion may include interface logic for receiving data via the first data port and command logic for issuing commands to the data collection device.

39 Claims, 25 Drawing Sheets

(51) Int. Cl.
*G06F 1/28* (2006.01)
*G06F 1/26* (2006.01)
*G06F 1/16* (2006.01)
*G09G 3/00* (2006.01)
*G06F 1/32* (2006.01)
*G06F 3/01* (2006.01)
*G06F 3/0346* (2013.01)

(56) References Cited

U.S. PATENT DOCUMENTS

| | | |
|---|---|---|
| 2003/0103744 A1 | 6/2003 | Koyama et al. |
| 2005/0141808 A1 | 6/2005 | Cheben et al. |
| 2007/0182812 A1 | 8/2007 | Ritchey |
| 2007/0273983 A1* | 11/2007 | Hebert ................ G02B 5/1895 359/708 |
| 2008/0239080 A1* | 10/2008 | Moscato ............. A42B 3/0426 348/148 |
| 2012/0105473 A1* | 5/2012 | Bar-Zeev ............ G02B 27/017 345/633 |
| 2012/0302289 A1* | 11/2012 | Kang ...................... G06F 3/011 455/557 |
| 2014/0326882 A1* | 11/2014 | Tar .......................... G01L 5/166 250/338.1 |
| 2015/0189166 A1* | 7/2015 | San Pedro Wandelmer ........ H04N 5/23222 348/333.11 |
| 2016/0063767 A1* | 3/2016 | Lee ...................... G06T 19/006 345/419 |

\* cited by examiner

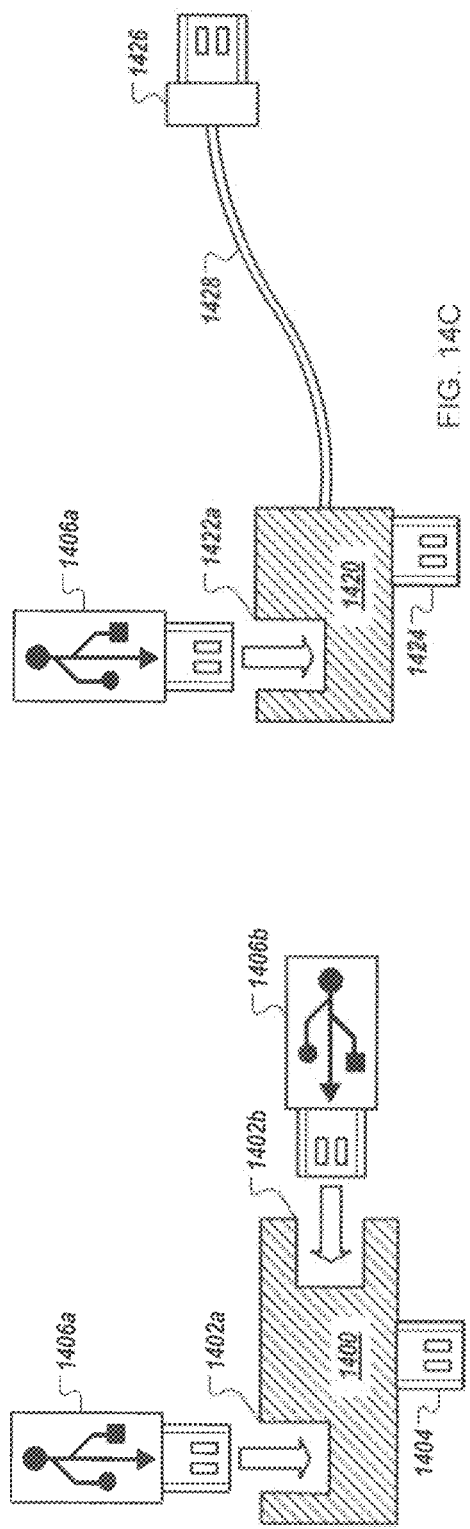

METHOD, SYSTEM, AND APPARATUS FOR BATTERY LIFE EXTENSION AND PERIPHERAL EXPANSION OF A WEARABLE DATA COLLECTION DEVICE

RELATED APPLICATIONS

The present application is related to and claims the priority of U.S. Provisional Patent Application No. 62/062,077 entitled "Method, System, and Apparatus for Battery Life Extension and Peripheral Expansion of a Wearable Data Collection Device" and filed Oct. 9, 2014 and also to U.S. Provisional Application No. 62/152,316 entitled "Method, System, and Apparatus for Battery Life Extension and Peripheral Expansion of a Wearable Data Collection Device" and filed Apr. 24, 2015. The present application is further related to U.S. patent application Ser. No. 14/511,039 entitled "Systems, Environment and Methods for Evaluation and Management of Autism Spectrum Disorder using a Wearable Data Collection Device" and filed Oct. 9, 2014, which claims the priority of both U.S. Provisional Application No. 61/943,727 entitled "Method, System, and Wearable data collection device 106 for Evaluation and Management of Autism Spectrum Disorder" and filed Feb. 24, 2014 and U.S. Provisional Application No. 61/888,531 entitled "A Method and Device to Provide Information Regarding Autism Spectrum Disorders" and filed Oct. 9, 2013. The contents of each of the documents listed above are hereby incorporated by reference in their entireties.

BACKGROUND

Wearable computing devices, such as Google Glass™, video gaming input devices, and health and fitness wearable devices, are used by a diverse body of wearers in a diverse set of circumstances. Wearable computing devices, in one example, enable users to manipulate and interact with a software application executing upon a stationary computing device (e.g., home use, work use, etc.). While this circumstance may present the user with reasonable opportunity for power recharging, wearable computing devices are also commonly used outdoors with little or no access to charging opportunities. Additionally, applications for wearable computing devices include activity intense usage which limits opportunities for recharging the wearable device such as applications involving medical surgery. There is a need for power expansion and recharging options beyond those available on the market today. For descriptions of example wearable computing devices, see U.S. Pat. No. 8,203,502 entitled "Wearable Heads-Up Display with Integrated Finger-Tracking Input Sensor" and filed May 25, 2011, and U.S. Patent Application No. 20140016800 entitled "Wearable Computing Device with Behind-Ear Bone-Conduction Speaker" and filed Jan. 16, 2014, the contents of which are hereby incorporated by reference in their entireties.

At present, for example, external battery power packs are available for common handheld electronic devices. Although these may be useful in recharging items such as tablet computers and cellular telephones, they are often too heavy and unwieldy to provide ample power expansion and recharging opportunity for wearable computing devices. Indeed, the present trend with wearable computing devices is towards ever smaller, lighter, and comfortable devices which allow the wearer easy range of action during use.

Additionally, there are other functions that are often limited or unavailable in current wearable especially heads-up wearable devices. For instance, some of the functionalities that are often missing include: expandable data storage, encrypted data storage, ability to choose when and how to send data to the cloud or to servers, ability to capture images that convey the immersiveness of having and using a heads-up display, ability to remotely access wearable hardware through an alternative channel to the factory default ones, and more.

SUMMARY

Wearable data collection devices (wearable computers and other wearable technology with data input capabilities such as a wearable health monitor or activity tracker) are designed to be worn by a user. In general, the wearable data collection device 106 104 or 108 may be configured as a single, physically-contiguous device, or as a collection of two or more units that can be physically independent or semi-independent of each other but function as a whole as a wearable data collection device. The wearable data collection device 106 can be arranged on the body, near the body, or embedded within the body, in part or entirely.

The wearable data collection device 106 can be configured to collect a variety of data. For example, a microphone device built into the data collection device may collect voice recording data, while a video camera device built into the data collection device may collect video recording data. The voice recording data and video recording data, for example, may be streamed via a network for storage or real time sharing of information.

Furthermore, in some implementations, the wearable data collection device 106 is configured to collect a variety of data regarding the movements and behaviors of the wearer. For example, the wearable data collection device 106 may include motion detecting devices, such as one or more gyroscopes, accelerometers, global positioning system, and/or magnetometers used to collect motion tracking data regarding motions of the wearer and/or head position data regarding motion particular to the wearer's head.

In some implementations, the wearable data collection device 106 is configured to collect eye tracking data. For example, the wearable data collection device 106 may include an eye tracking module configured to identify when the wearer is looking straight ahead (for example, through a glasses style wearable data collection device) and when the wearer is peering up, down, or off to one side.

The wearable data collection device, in some implementations, is configured to monitor physiological functions of wearer. In some examples, the wearable data collection device 106 may collect heart and/or breathing rate data, electrocardiogram (EKG) data, electroencephalogram (EEG) data, and/or Electromyography (EMG) data. The wearable data collection device 106 may interface with one or more peripheral devices, in some embodiments, to collect the physiological data. For example, the wearable data collection device 106 may have a wired or wireless connection with a separate heart rate monitor, EEG unit, or EMG unit. In other embodiments, at least a portion of the physiological data is collected via built-in monitoring systems. Optional onboard and peripheral sensor devices for use in monitoring physiological data are described in relation to FIG. 12.

A wearable data collection device, in some implementations, is a head-mounted wearable computer. A wearable data collection device 106 may include an optical head-mounted display (OHMD). In a particular example, the wearable data collection device 106 may be a standard or modified form of Google Glass™ by Google Inc. of Mountain View, Calif. In some implementations, the data collection device includes a bionic contact lens. For example, the OHMD may be replaced with a bionic contact lens capable of providing augmented reality functionality. In another example, an implantable device, such as a visual prosthesis (e.g., bionic eye) may provide augmented reality functionality.

When one or more components of the wearable data collection device 106 is embedded within the body, the one or more components can be embedded beneath the skin; within the brain; in contact with input or output structures of the body such as peripheral nerves, cranial nerves, ganglia, or the spinal cord; within deep tissue such as muscles or organs; within body cavities; between organs; in the blood; in other fluid or circulatory systems; inside cells; between cells (such as in the interstitial space); or in any other manner arranged in a way that is embedded within the body, permanently or temporarily. When one or more components of the wearable data collection device 106 is embedded within the body, the one or more components may be inserted into the body surgically, by ingestion, by absorption, via a living vector, by injection, or other means. When one or more components of the wearable data collection device 106 is embedded within the body, the one or more components may include data collection sensors placed in direct contact with tissues or systems that generate discernible signals within the body, or stimulator units that can directly stimulate tissue or organs or systems that can be modulated by stimulation. Data collection sensors and stimulator units are described in greater detail in relation to FIG. 12.

For a description of additional uses and configurations for a head-mounted computer system as described herein, see U.S. patent application Ser. No. 14/511,039, entitled "Systems, Environment, and Methods for Evaluation and Management of Autism Spectrum Disorder Using a Wearable Data Collection Device" and filed Oct. 9, 2014, incorporated by reference in its entirety.

Wearable data collection devices, for comfort and ease of use, are typically configured as wireless devices. Further, for comfort and ease of use, the weight of wearable data collection devices is often minimized during design. As such, power consumption and battery life can be problematic for wearable data collection devices.

A releasable power attachment apparatus connects to a wearable data collection device 106 to extend the battery life of the wearable data collection device 106 with a secondary power source contained within the releasable power attachment apparatus. The power source within the releasable power attachment apparatus may include a Lithium Ion battery.

In some implementations, the releasable power attachment apparatus includes charging apparatus. For example, the releasable power attachment apparatus may include an induction charging apparatus for connection-free charging of the releasable power attachment apparatus. In this manner, the releasable power attachment apparatus may be charged while connected to or disconnected from the wearable data collection device. The charging apparatus, furthermore, may be used for maintaining the power level of the releasable power attachment apparatus during use. For example, the releasable power attachment may include one or more solar panels, thermoelectric charging mechanisms, and/or piezoelectric charging mechanisms to maintain power source charge or slow depletion thereof.

In addition to or instead of enhancing battery life of a wearable data collection device, in some implementations, the releasable peripheral attachment apparatus includes one or more peripheral expansion elements for expanding the capabilities of the wearable data collection device. For example, the releasable peripheral attachment apparatus may include one or more memory components, integrated circuit components, audio enhancement components, wireless communication components, sensor components, data encryption components, image/video capture components, and/or lighting components. The peripheral expansion elements, in some embodiments, are built into a particular releasable peripheral attachment apparatus. For example, a user may obtain a number of releasable peripheral attachment units, each with one or more expansion elements. The user may select a particular releasable peripheral attachment unit based upon a current desired use. For example, some releasable peripheral attachment units may weigh more than others but include components useful in certain circumstances, such as low light situations. In further embodiments, one or more peripheral expansion elements may be releasably connectable to a releasable peripheral attachment apparatus. For example, an external imaging component such as a rear-view video camera component may be releasably attachable to a releasable peripheral attachment apparatus.

In some implementations, the releasable peripheral attachment apparatus includes multiple separable portions. For example, a power supply portion of the releasable peripheral attachment apparatus may be separated from a wearable data collection device 106 interface component such that a user may swap power supply or other peripheral portions out, for example allowing for recharging a first power supply portion while using a second power supply portion. In this manner, the user may continue to interact with the wearable data collection device 106 for extended periods of time (e.g., virtually "nonstop") without interruption due to loss of power. Additionally, by maintaining connection of the interface portion with the wearable data collection device, a connection port may be protected from damage (e.g., due to repeated connection/disconnection when changing out the releasable peripheral attachment apparatus).

In some implementations, a variety of power supply portions may be available to a user depending upon a present utility desired by the user. For example, each version of the power supply portion may have a variety of power supply, power charging, and/or peripheral element options. Depending upon a number of aspects, including cost, weight, and compatibility with desired use, the user may select a particular version of power supply portions to suit present needs. In a particular example, the user may connect a power supply portion including a solar panel and solar charging system for instance including solar charge circuitry to the wearable data collection device 106 interface component for outdoor use.

In some implementations, the user may connect a power supply portion including a solar panel and/or alternative mechanisms for energy collection, for instance including mechanisms for energy collection that use materials that obtain usable energy from heat or changes in heat, such as thermoelectric and/or pyroelectric materials, and/or materials that obtain usable energy from force or movement such as piezoelectric materials, and/or materials that obtain usable energy from electromagnetic radiation such as antenna-like materials and transducers. In some implementations, a power supply portion may include two or more mechanisms for energy collection arranged together, for instance where a mechanism of solar energy collection, which generally involve waste heat being created, is arranged in conjunction with a mechanism for obtaining usable energy from heat or changes in heat, such that heat emitted from solar energy collection is harvested and used to capture more of the incoming energy from the sun. Many such combinations of two or more mechanisms for energy collection are possible and anticipated.

Although described herein as a releasable power attachment apparatus for a wearable data collection device, the releasable power attachment apparatus may additionally or alternatively be used to extend the battery life of any portable data collection device or handheld computing device such as a smart phone, cellular phone, tablet computer, personal digital assistant, and/or handheld gaming device. A modified version of the releasable power attachment apparatus, for example, may be designed as a "shoe" to connect to the micro USB port interface of a smart phone.

BRIEF DESCRIPTION OF THE FIGURES

FIGS. 14A-C are block diagrams of example USB port splitters.

DETAILED DESCRIPTION

FIGS. 1A through 1D illustrate an example releasable peripheral attachment apparatus connected to a head-mounted glasses style wearable data collection device. As illustrated, the wearable data collection device 106 is a Google Glass™ device.

Figure 1A:
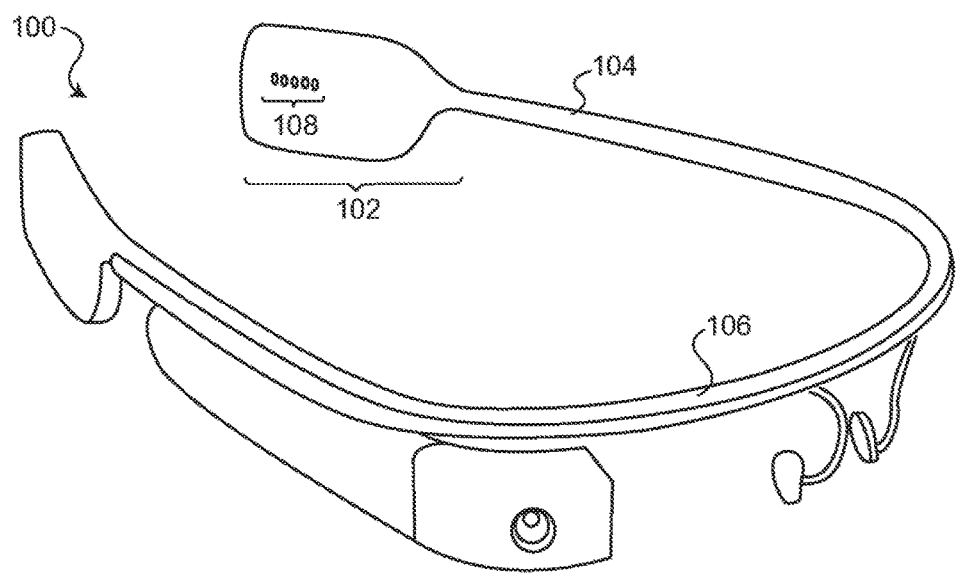
FIGS. 1A through 1D illustrate an example releasable peripheral attachment apparatus for a wearable data collection device.

As illustrated in FIG. 1A, an example configuration 100 includes a releasable peripheral attachment apparatus 102 connected to a left ear stem 104 of a wearable data collection device 106. The releasable peripheral attachment apparatus 102 includes a series of indicator lamps 108. The indicator lamps 108, for example, may illustrate charge level of the peripheral attachment apparatus 102. Alternatively/additionally, the indicator lamps 108 may be used to present a various error status indications. For example, using a series of five indicator lamps 108, up to thirty-two unique codes may be possible for indicating an error condition. To avoid confusion between battery charge level indication and error code indication, in one example, the LED lamps may be pulsed or otherwise modulated when presenting an error code. In another example, only those "codes" which are not aligned in series (e.g., which may be mistaken for battery charge level indication) may be used for error indication. In further embodiments, the indicator lamps may be flashed or pulsed in a unique pattern (e.g., somewhat like morse code, such as an ON-OF-OFF-ON-OFF pattern) to designate a particular error condition.

Figure 1B:
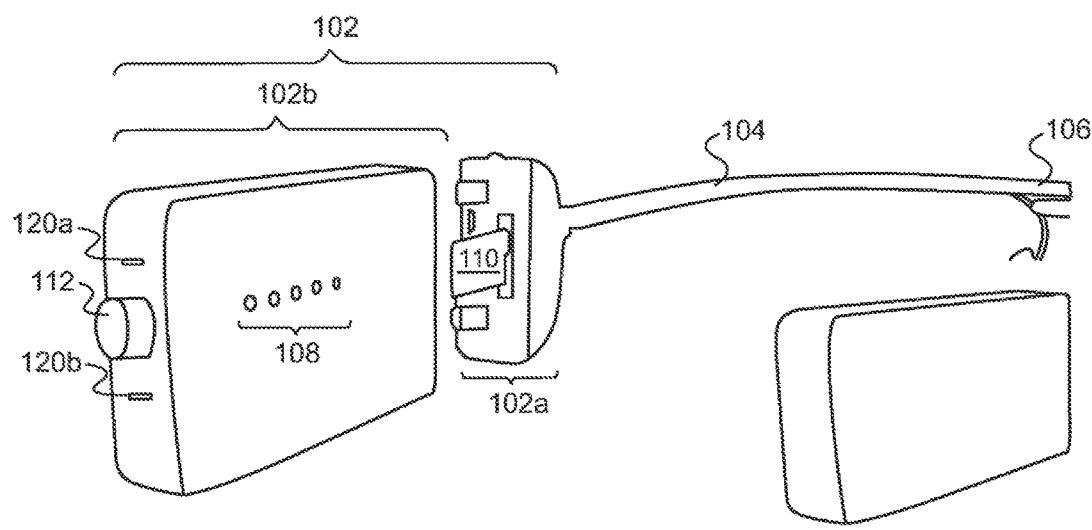

Turning to FIG. 1B, the releasable peripheral attachment apparatus 102 is separated into an interface portion 102a and a swappable portion 102b. The interface portion 102a in some embodiments is mounted on a USB connection of the wearable data collection device 106. In some other configurations, the interface portion 102a is mounted on the wearable data collection device 106 by clipping, clamping, surrounding, pressure-gripping, adhering to, or otherwise attaching physically to the wearable data collection device 106. In some configurations involving Google Glass® as the wearable data collection device 106, the interface portion has a tubular or extruded rectilinear opening that is slid over the end of the rim of the Glass device, on the side opposite the existing battery module. The interface portion 102a, in some examples, contains a removable integrated circuit (e.g., SIM card) and/or memory component 110 (e.g., SD, MMC, micro-SD, etc.) and/or USB controller circuitry, and/or USB2Go controller circuitry, and/or circuitry that allows the interface portion 102a to be recognized by the Android® operating system or other operating system as may be used by the wearable data collection device 106, and/or an energy storage device such as a battery or super/ultra-capacitor (which may be in addition to an energy storage device in the swappable portion), and/or circuitry to support a software license key manager, such that software installed on the wearable data collection device can be modulated, activated, unlocked, updated, or modified by the circuitry and firmware or software on the interface portion 102a or swappable portion 102b.

The integrated circuit component and/or memory component 110 interface is described in greater detail in relation to FIGS. 2A and 2B.

The swappable portion 102b, in some implementations, includes a power source such as a Lithium Ion or Lithium Polymer battery or other similar energy storage device. In addition to or in lieu of the power source, the swappable portion 102b may include charging apparatus such as an induction charging apparatus for connection-free charging of the releasable peripheral attachment apparatus 102 and/or charging of a wearable data collection device 106 to which it may be attached or otherwise electrically coupled. To further enhance charging capabilities, the swappable portion 102b may include one or more solar panels, thermoelectric charging mechanisms, and/or piezoelectric charging mechanisms to maintain power source charge or slow depletion thereof.

In some implementations, the swappable portion 102b includes one or more peripheral expansion elements for expanding the capabilities of the wearable data collection device. For example, the swappable portion 102b may include one or more memory components, integrated circuit components, audio enhancement components, wireless communication components, sensor components, data encryption components, image/video capture components, and/or lighting components. Although described in relation to the swappable portion 102b, one or more of the peripheral expansion elements may be included within the interface portion 102a.

By designing the releasable peripheral attachment apparatus 102 as a two-piece unit, the interface portion 102a may remain somewhat permanently mounted to the wearable data collection device 106 while the swappable portion 102b is released for charging and/or replaced with additional swappable portions. In some implementations, a variety of swappable portions may be added interchangeably, each with unique features. A variety of potential features of the swappable portion 102b are described in greater detail with relation to FIGS. 3 through 6. The swappable portion 102b, for example, may include a camera port 112. Further, an illumination port 120a and/or motion sensor port 120b may be arranged near the camera port 112 (e.g., as illustrated in the example implementation, above and below the camera port 112) to support functionality of the camera. For example, the illumination port 120a may be configured to provide illumination from one or more LEDs (e.g., flash LEDs and/or infrared LEDs) to enable low light image capture by the camera. The motion sensor port 120b, in another example, may be used to house a motion sensor to identify movement behind the wearer of the wearable data collection device 106 to trigger image capture by the camera. These features, for example, are discussed in more detail in relation to method 900 of FIG. 9A and method 950 of FIG. 9B. In another example, turning to FIG. 3A, an outlet may supply a data and/or power port 306 (e.g., micro USB port) downward-facing from the swappable portion 102b of the releasable peripheral attachment apparatus 102. Example power connection configurations between the power port 306 and the wearable data connection device 106 are discussed in more detail in relation to FIGS. 6 and 7.

Figure 1C:
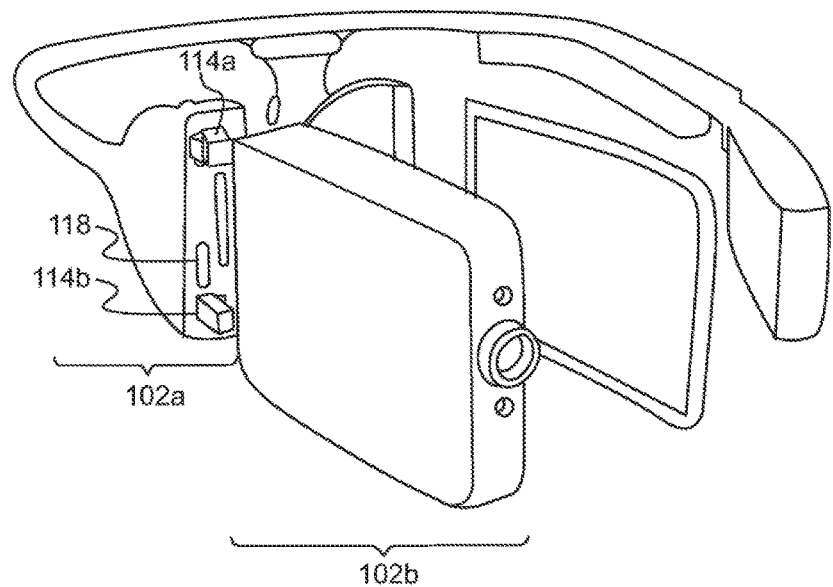
Figure 1D:
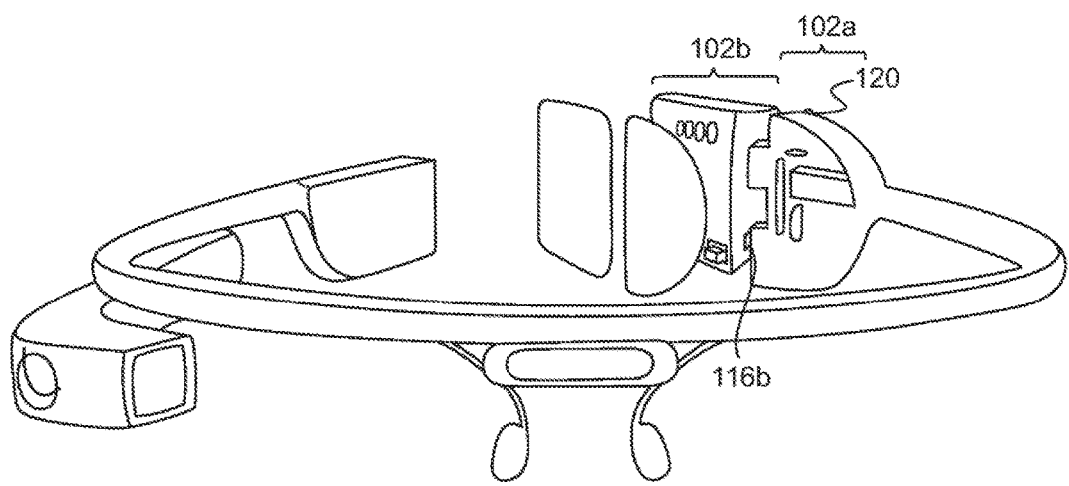

FIGS. 1C and 1D illustrate separated views of the casings for the interface portion 102a and swappable portion 102b of the releasable peripheral attachment apparatus 102. The interface portion 102a, as illustrated includes a set of tension clips 114 for releasable attachment to a set of mated slots 116 within the swappable portion 102b. A release button 120 within the interface portion 102a, for example, may be pressed to release the swappable portion 102b from the interface portion 102a for swapping a depleted power supply with a charged power supply.

Figure 3A:
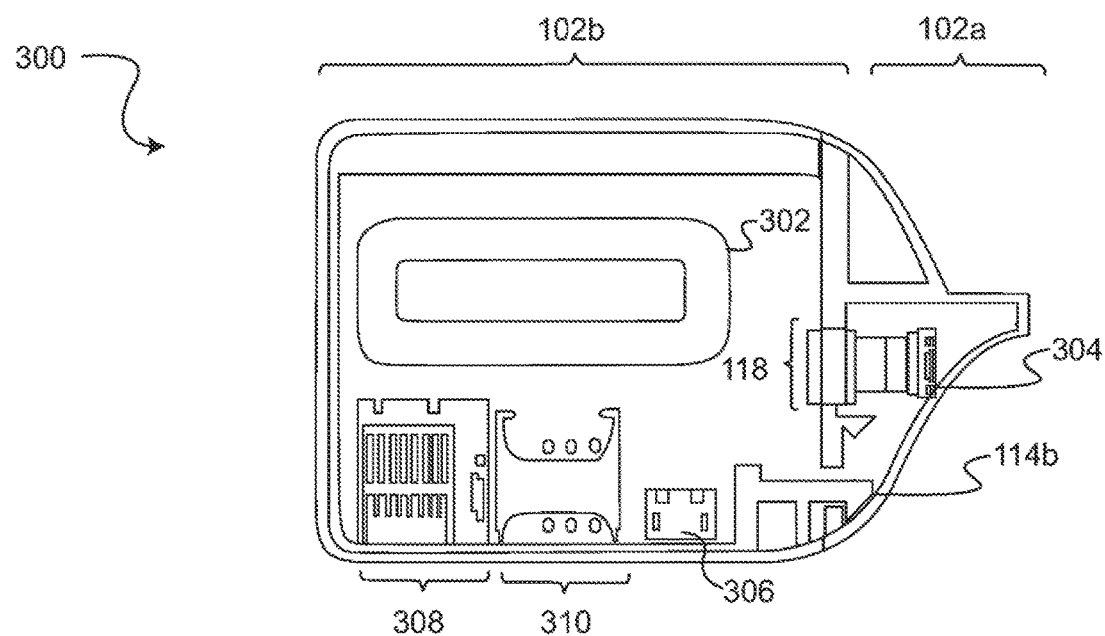
FIGS. 3A and 3B illustrate a first example internal configuration of the releasable peripheral attachment apparatus of FIGS. 1A through 1D including an induction coil component.
Figure 4A:
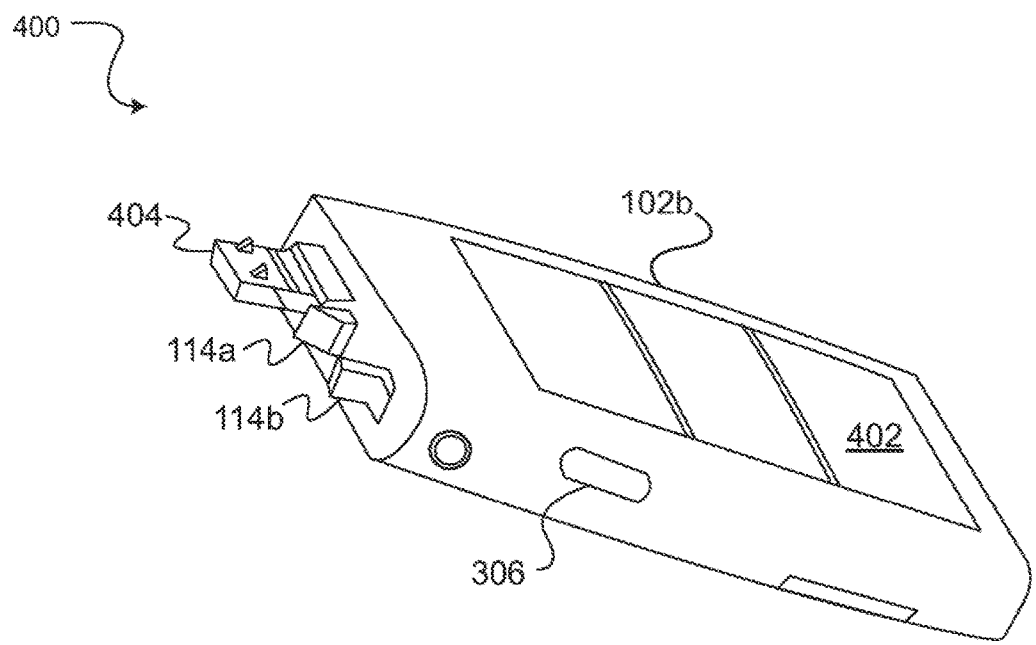
FIGS. 4A through 4C illustrate example external configurations of the releasable peripheral attachment apparatus of FIGS. 1A through 1D including a solar collection component.

Upon connection of the swappable portion 102b with the interface portion 102a, an internally configured data port (e.g., micro USB port) may provide a data connection between the swappable portion 102b and the interface portion 102a. As illustrated, a data port opening 118 is provided upon the swappable portion 102b facing surface of the interface portion 102a of the releasable peripheral attachment apparatus 102. The swappable portion 102b may have an additional port such as a micro-USB port, for instance on the back or underside, thus providing a mechanism for charging the battery within and for establishing a data connection with the swappable portion 102b as a stand-alone device, decoupled from the rest of the system. In other examples, a wire can connect the interface portion to the data and/or power port(s) of the underlying wearable data collection device 106. In the case of Google Glass®, such a wire can extend along the inside of the rim from the otherwise empty left side of the rim and terminate in a male USB plug in order to couple directly with Glass or with an intermediary device. As shown in FIG. 3A, for example, a data port 304 extends through the data port opening 118 to provide communication between the swappable portion 102b and the interface portion 102a. Turning to FIG. 4A, the swappable portion 102b may include a data port connector 404 for enabling communication between the swappable portion 102b and the interface portion 102a.

Figure 2:
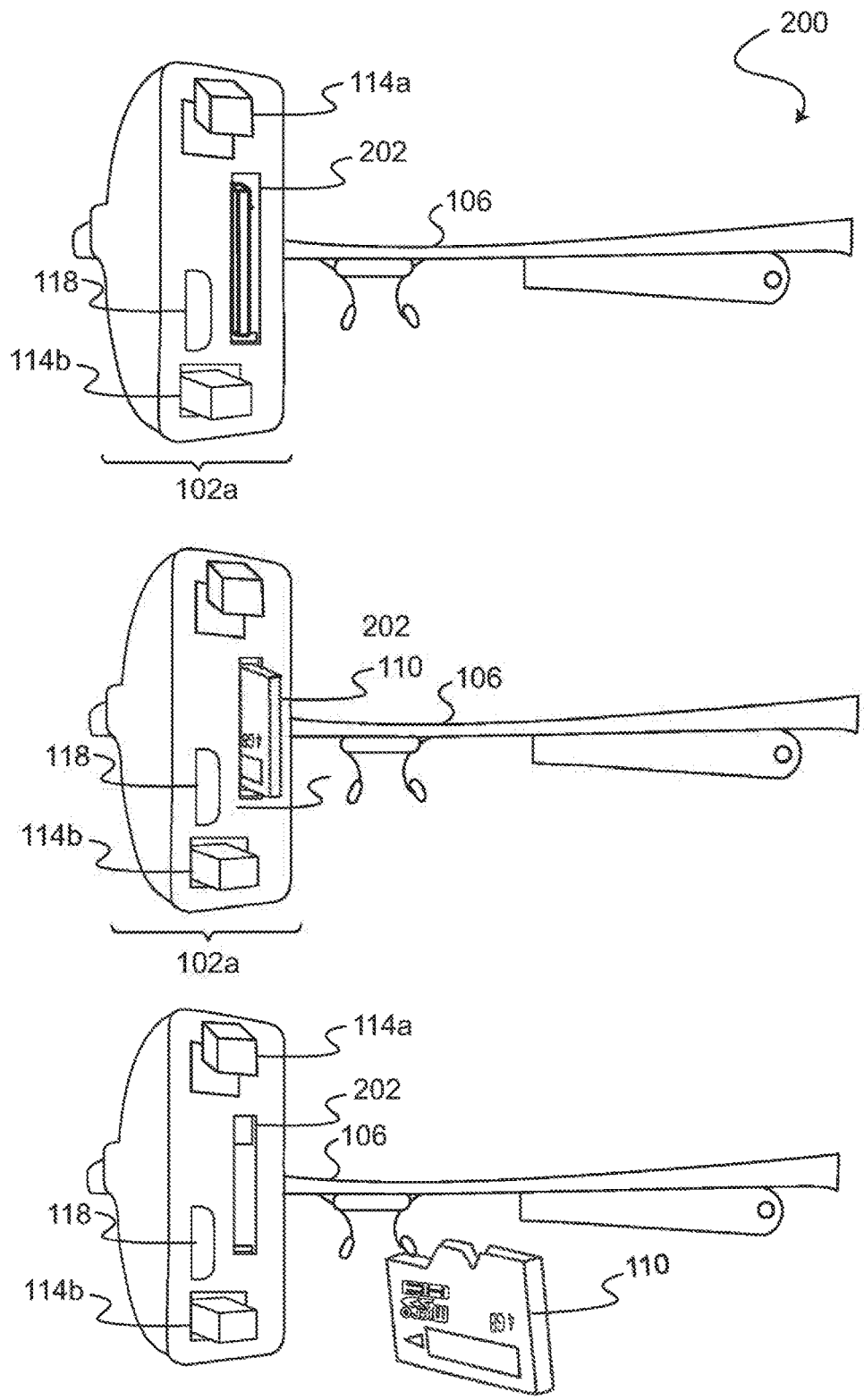
FIG. 2 illustrates a memory port and releasable memory device components for use with the releasable peripheral attachment apparatus of FIGS. 1A through 1D.

FIG. 2 illustrates a time series diagram 200 demonstrating removal of the memory device component 110 from a memory port 204 of the releasable peripheral attachment apparatus 102 of FIGS. 1A through 1D. Data may be removed from the memory device component 110 through a wired (e.g. via a micro USB port or other external data connection) or wireless connection. An example method for using the memory device component 110 for secure data collection and storage is described below in relation to FIG. 10. Memory or digital storage space may also be provided in a non-removable manner, for instance on dedicated chips inside either piece of the device.

Memory or storage space allows for additional ability to store data, and it also allows the ability of the user to control data security. For instance, data can be stored on one or the other component of the releasable device 102, and encrypted in place, or disallowed from being transmitted via a public network such as the Internet (e.g., to Google® in the Google Glass® example).

Additionally, mobile subscriber identifying circuitry such as a subscriber identity module (SIM) card can be part of the system, thus allowing for a completely standalone system. That would mean that the wearable data collection device including the releasable peripheral attachment apparatus 102 (plus SIM) could act as a freestanding system to take and receive calls and to navigate the wearer through the world, from anywhere.

Although illustrated as a removable component mounted within the interface portion 102a of the releasable peripheral attachment apparatus 102, in other implementations, the memory device component 110 may be permanently mounted within the interface portion 102a of the releasable peripheral attachment apparatus 102. In further implementations, the swappable portion 102b may include one or both of the memory device component 110 and a removable integrated circuit (e.g., SIM) component. For example, turning to FIG. 3A, a memory component holder 308 and an integrated circuit component holder 310 are mounted side-by-side within the swappable portion 102b.

Figure 3B:
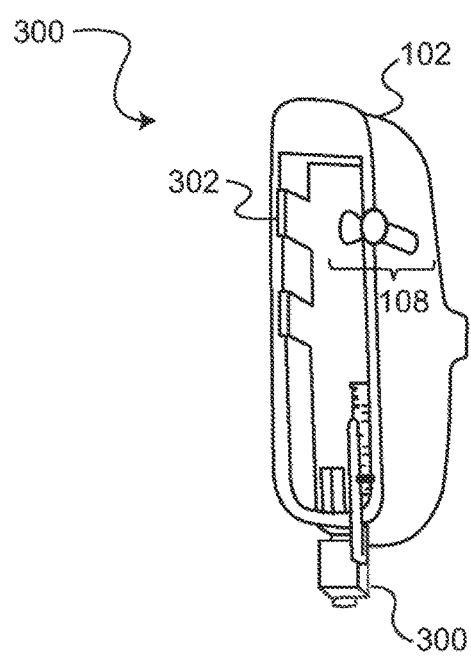

FIGS. 3A and 3B illustrate a first example configuration 300 of the releasable peripheral attachment apparatus 102 of FIGS. 1A through 1D including an induction coil component 302. As illustrated in FIG. 3A, an internal view of the configuration 300 illustrates the induction coil component 302 wrapped upon the interior wall of an externally-facing surface (e.g., away from the wearer's head) of the swappable portion 102b of the releasable peripheral attachment apparatus 102. Turning to FIG. 3B, a cross-sectional view of the configuration 300 illustrates the positioning of the induction coil component 302. The induction coil component 302 is an example of a means for receiving electromagnetic energy at a distance, allowing for wireless recharging of the battery. Coils, in various configurations, can be mounted in either side of the housing of the swappable portion 102b or in either side of the housing of the interface portion 102a, or embedded in the printed circuit board within either portion. Induction coils can actually be a broad category and some em power receivers are not simple coils.

Rather than or in addition to an internally configured induction coil component, in some embodiments, the releasable peripheral attachment apparatus 102 may include a heat dissipating material on the surface opposite the face of the user to encourage heat dissipation into the atmosphere. The material may be interior to, interior and exterior to, or otherwise integrated into the material of the external surface of the releasable peripheral attachment apparatus 102.

In some configurations, the releasable peripheral attachment apparatus 102 may include an overlaying structure, such as a rigid, semi-rigid, or flexible wrap, that overlays at least a portion of the releasable peripheral attachment apparatus 102. The overlaying structure may additionally overlay at least a portion of the wearable data collection device with heat dissipating material. For example, as illustrated in FIG. 4C where a user is donning an apparatus including a releasable peripheral apparatus connected directly to a heat-generating portion of the wearable data collection device (e.g., the housing of the processing circuitry of the Google Glass device), an overlay may clip over (e.g., frictionally attach, snugly fit, etc.) or wrap (e.g., snugly engage at least a portion of the way surrounding the effective components) both the stem of the wearable data collection device containing the heat-generating circuitry as well as a portion of the releasable peripheral apparatus. In the circumstance, the overlay structure may additionally function as a retaining element for retaining the releasable peripheral attachment to the wearable data collection device.

In embodiments including an overlaying structure partially overlaying the wearable data collection device, a perforated patterning may be applied to the external surface of the overlaying structure. For example, a Google Glass explorer type device is designed to receive finger swipe inputs along the stem where the releasable peripheral apparatus is attached as illustrated in FIG. 4C. To maintain adequate user interface contact with the surface of the stem, the overlaying structure may be designed in a mesh patterning. The mesh, in some examples, may include decorative patterns, such as a corporate logo, picture, or other design.

Figure 4B:
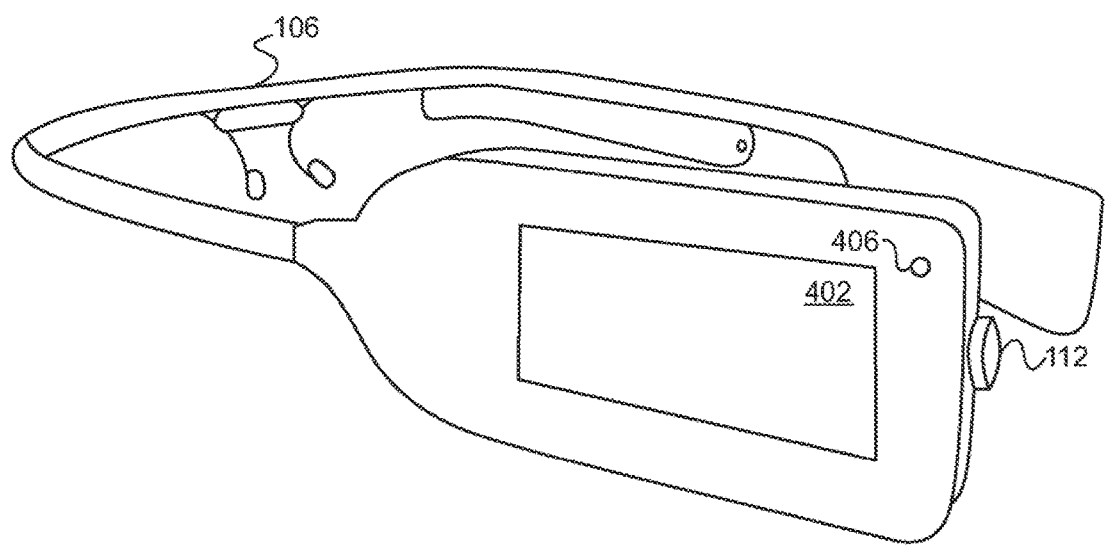
Figure 4C:
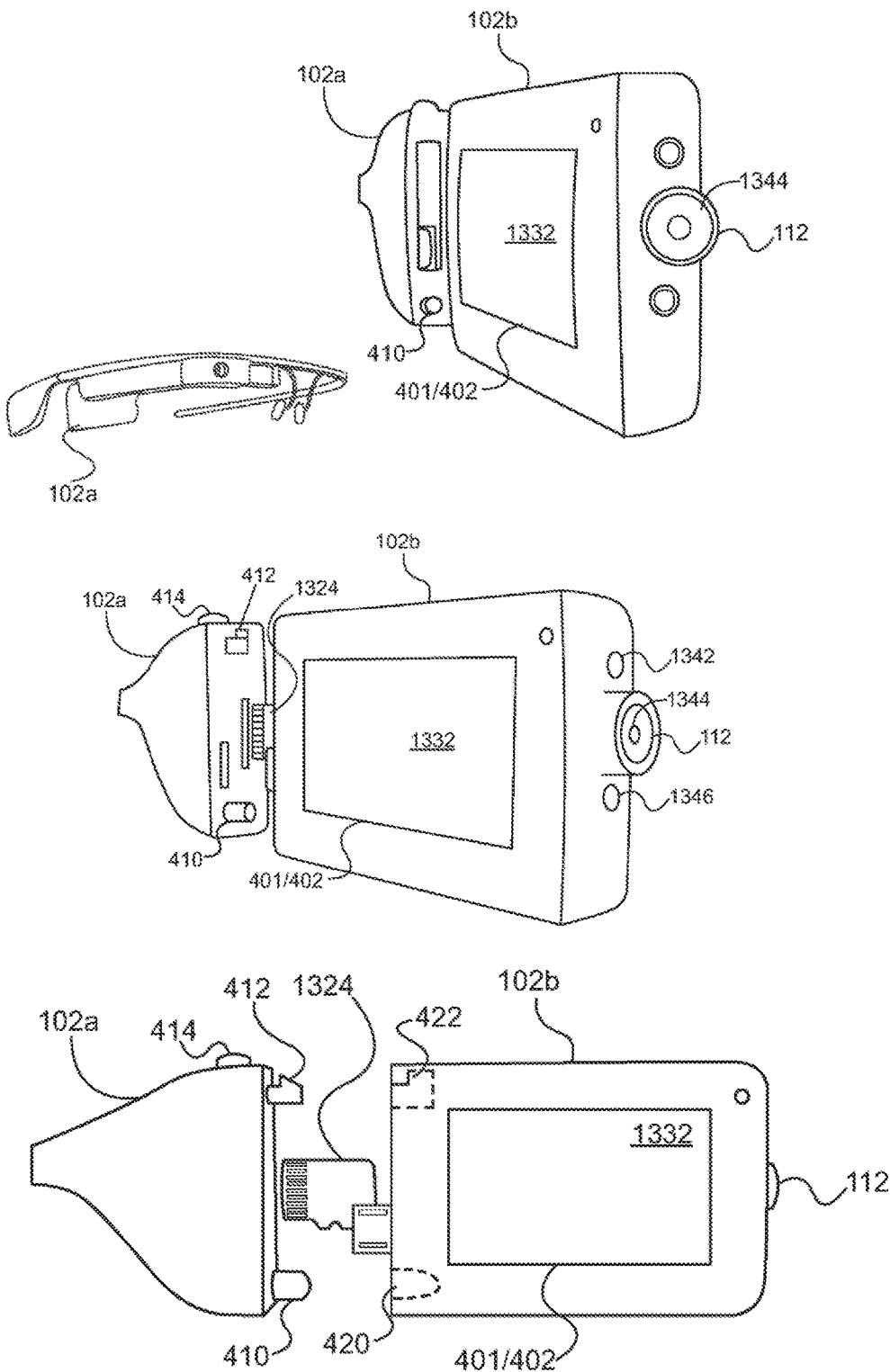

FIGS. 4A and 4B illustrate an example external configuration 400 of the releasable power attachment apparatus of FIGS. 1A through 1D including an energy-gathering unit 401 aimed to gather usable energy from energy sources in the environment, such as for instance with a solar collection assembly 402.

FIG. 4C illustrates an example external configuration of the releasable power attachment of FIGS. 1A through 1D, including an energy-gathering unit 401, in the context of several other components and a different coupling mechanism and configuration than FIGS. 4A and 4B. For instance, an energy-gathering unit 401 including a solar collection assembly 402, which includes a solar panel 1332, is illustrated in a configuration on one of the lateral surfaces of the swappable portion 102b of the releasable peripheral attachment apparatus 102.

In some configurations, an energy-gathering unit 401 can be arranged to be part of the interface portion 102a rather than the swappable portion 102b of the releasable peripheral attachment apparatus 102. In some configurations, both arrangements are possible.

When an energy-gathering unit 401 is arranged to be part of the swappable portion 102b, energy gathered by the energy-gathering unit 401 can be used directly to power the power-consuming components of the energy-gathering unit 401 and/or to charge a battery or other energy-storage device (such as capacitors or super-capacitors) contained within the swappable portion 102b. Additionally, when an energy-gathering unit 401 is arranged to be part of the swappable portion 102b, energy gathered by the energy-gathering unit 401 can be used to make the swappable portion 102b more free-standing or independent, because such a configuration not only has a source of energy and energy storage, e.g. a battery, but it has a mechanism of energy gathering that can provide energy to be stored in said mechanism for energy storage. This is particularly useful because in some configurations, the swappable portion 102b can be used independently for extended periods of time, for instance to be used as a camera module that is independent of the interface portion 102a and of the wearable data collection device 106 (in such configurations, the swappable portion 102b also contains a mechanism for data storage).

In some configurations, an energy-gathering unit 401 can be arranged to integrate directly with the wearable data collection device. For instance, an energy-gathering unit 401 may be configured to attach directly to an outer surface of a wearable data collection device. For instance in one implementation, an energy-gathering unit 401 may be configured in the form of a sticker or decal and can be placed directly on an outer surface of a wearable data collection device, for instance on the lateral surface of the existing battery pod or part of the instrument arm, (e.g., such as in the example of Google Glass®, explorer edition).

Returning to FIG. 4C, additional components are illustrated that may be part of some configurations, for instance a camera port 112 within which is visible a camera lens 1344. Below the camera lens 1344 in this illustrative example is a flash/flashlight/infra-red LED module 1346, and above the camera lens 1344 in this illustrative example is a motion sensor module 1342. Also illustrated is a removable memory module 1342. The mechanism of coupling between the interface portion 102a and swappable portion 102b of the releasable peripheral attachment apparatus 102, in some configurations, can include a non-moving insertable post 410 on one portion of the interface portion 102a that couples with a receptacle 420 on the swappable portion 102b. Furthermore, the interface portion 102a, in some configurations, can include a moveable tooth 412 that can be moved by a button 414 and this moveable tooth 412 can fit into a notched receptacle 422. When the moveable tooth 412 is inserted into the notched receptacle 422, in some configurations, it snaps into place and snugly holds together the interface portion 102a and swappable portion 102b of the releasable power attachment apparatus. Likewise, when the button 414 is pressed, the moveable tooth in some configurations moves for instance to decouple from the notched receptacle 422, thereby releasing the interface portion 102a from the swappable portion 102b.

The present disclosure anticipates countless functionally similar mechanisms for coupling and decoupling the portions 102a and 102b and incorporates them herein. The key advantages of such a system include the following. A.) The interface portion can be relatively uncomplex and inexpensive while the swappable portion 102b can contain the battery as well as other components such as an energy-gathering unit 401. B.) the interface portion 102a can have just enough circuitry to maintain a connection with a wearable data collection device, for instance Google Glass® or future versions of Google Glass® or other wearable data collection devices, for instance to maintain a connection by being recognized by the Android® system or other operating system as a peripheral device and thereby kept actively connected. This can be useful so that some functionalities can be removed and replaced, such as an external battery or camera or data store or solar charge unit, yet without Android® or another operating system temporarily losing contact with the peripheral unit as a whole. When such an operating system does lose contact with a peripheral unit it can be difficult to re-establish contact without a reboot, which is disruptive, and/or the re-established contact may be somewhat different such as with a different address or device designation assigned internally. For this reason it is advantageous to have enough circuitry and components in the interface portion in order to maintain the connection and yet still minimal in order to reduce the cost. C.) The interface portion 102a is the part that must be configured specifically for a given host device such as the wearable data collection device, whereas the swappable portion 102b need only interface with the interface portion 102a, for which it is designed. This means that a customer can readily invest in a whole collection of swappable portions 102b, for instance to have multiple spare batteries on hand and to have different sets of functions such as in some cases an additional camera and/or wireless charging and/or solar power, as may be configured in variants of the swappable portion 102b that can be separately purchased. This is similar to the way photographers purchase multiple specialized lenses with partially non-overlapping features, reassured by knowing that all of them will fit into a standard interface or coupling that is the common intermediary that gives them access to an array of cameras. Similarly, a user can purchase one interface portion 102a for a given wearable data collection device, and then purchase a multitude of swappable portions 102b, some alternatively configured perhaps or with varying features, at the same time or spread out over time. They will all work with the interface portion 102a and therefore with the wearable data collection device. D.) Another advantage of this system, similarly, is that it allows for easy and affordable access to multiple or alternative wearable data collection devices. If a user obtains a future version of Google Glass® or an alternative wearable data collection device 106 or another base data collection device entirely, the investment in the system will still be worthwhile. That is to say, all the swappable portions 102b can still be used, so long as an interface portion 102a is provided that is compatible with the new wearable data collection device. In some configurations, an interface portion 102a is configured to physically interface with an alternate wearable data collection device, for instance in one of the ways described herein for interfacing with a wearable data collection device, such as fitting directly on a rim of an eyeglass-like device, or physically coupling to a data port such as a USB port, or other configurations. In this way, a user can remain part of the ecosystem of peripheral products represented here, and readily switch to a new wearable data collection device, by simply acquiring a new interface portion 102a.

An additional advantage of the example implementation in FIG. 4C is that all of the protruding elements associated with physically coupling the interface portion 102a to the swappable portion 102b are on the interface portion 102a, which means that the swappable portion has no protrusions other than the data/power port such as the micro-USB male plug in as illustrated. This supports one of the key functions of the swappable portion 102b, which is that it can function as a standalone device, namely, it can be used to provide electricity to other devices, for instance the microUSB male plug can be inserted into microUSB female receptacles on smart phones or other devices (including those with custom ports such as those made by Apple® Corporation, by way of a small adapter). In this way, the swappable portions 102b can be used to charge phones and other devices, which gives them an additional set of functions and therefore value. Likewise, the swappable portion 102b can be used to connect directly to a computing device or network, via that same data/power port such as a microUSB male plug, to upload and download data, to interact with onboard software, firmware and diagnostics, to view or print or share media, or other reasons associated with connected multimedia devices.

That being said, in some configuration, protruding hardware can be arranged on the swappable portion 102b so that the interface portion 102a is visually unencumbered when it is left without any swappable portion 102b attached. Similarly, in some implementations, the mechanism of physical coupling does not involve visually or physically distracting or encumbering pieces. This allows for another key feature of the releasable peripheral attachment apparatus 102.

Namely, the apparatus 102 does not have to be coupled to be in use. That is, the releasable peripheral attachment apparatus 102 as a whole can be implemented as only an interface portion 102a, and in some implementations is whole and complete without the presence of a swappable portion 102b but simply with the ability to potentially connect to or couple with a swappable portion 102b. In this case, in implementations involving Google Glass® for instance, the Glass® device can be worn and used with only the interface portion 102a mounted on the rim of Glass®.

In other embodiments, the two portions can be coupled but not physically in contact directly with each other. For instance, an implementation of the interface portion has a wire or can use the port such as a microUSB port to accept a wire. In this case, the swappable portion 102b can be elsewhere on the body or nearby, with a thin USB wire for instance. In this way, the swappable portion 102b can be larger than if connected directly, and have more capabilities. The interface portion can be connected directly to the microUSB port on the lower surface of Glass®, in such implementations (see in FIG. 4C, middle left). It can provide a complete set of capabilities, even if it is also capable of providing more when and if a swappable portion is attached in some manner.

Returning to FIG. 4C, the energy-gathering unit 401 is illustrated with a solar-collection assembly 402 as the outer and thus visible layer. In some configurations there may be multiple layers to the energy-gathering unit 401 that may or may not include a solar collection assembly 402.

Figure 4D:
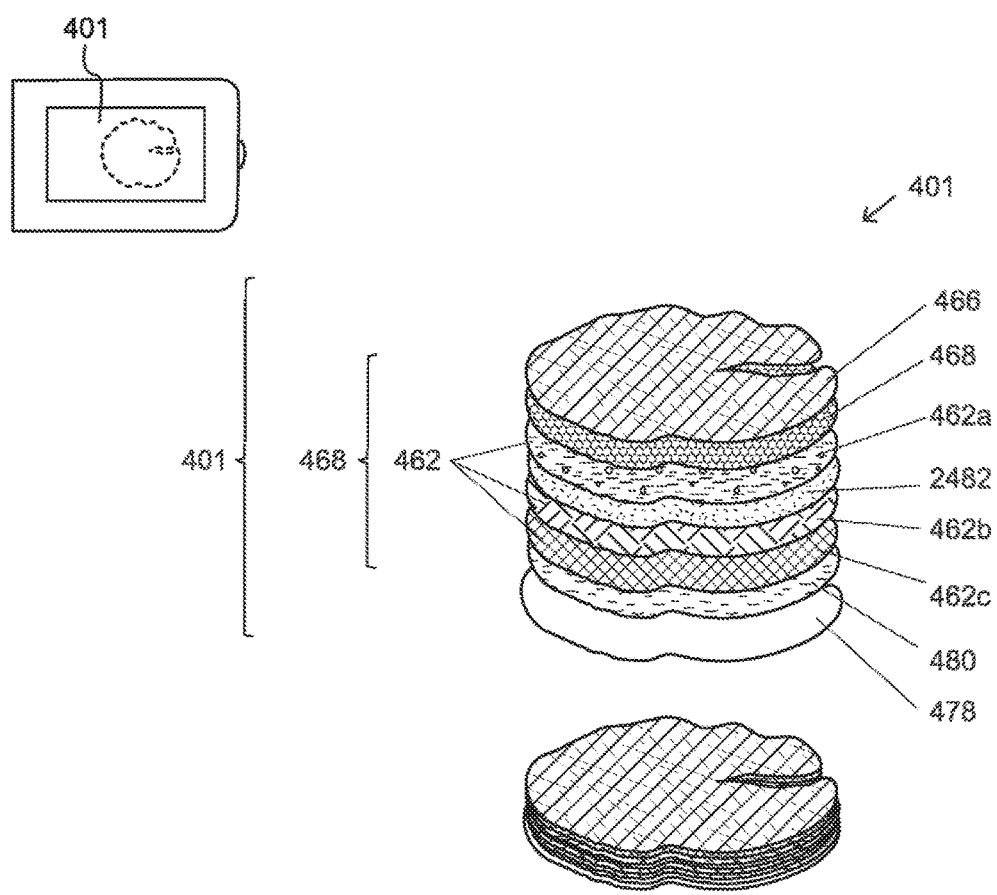
FIGS. 4D through 4J illustrate example internal configurations of a solar collection component, such as the solar collection components illustrated in FIGS. 4A through 4C.

FIG. 4D is an illustrative example of a multi-layer energy-gathering unit 401, and visually explains the terminology used herein to distinguish amongst the various parts and levels of organization of an energy-gathering unit. FIG. 4D is also a terminology legend, using the example embodiment above as a prototype. FIG. 4D is provided to help the reader in understanding the several "unit", "assembly" and "complex" designations, some of which are as subsets of each other.

The energy-gathering "unit" is the whole item, which can include one or more energy-gathering "assemblies" such as a solar collection assembly 402. An energy-gathering assembly such as a solar collection assembly 402 can have multiple layers or components within it, such as a solar panel 1332. When there are multiple energy-gathering assemblies combined, they together form one energy-gathering "complex", which is composed of multiple assemblies, and yet which differs from the "unit" level because an energy-gathering unit is the whole item and may include other components such as inert base layers that are not part of the energy-gathering complex but which may be used to bind together the unit. See FIG. 4D for a visual legend to these distinctions.

In some embodiments, a solar collection assembly 402 can have multiple parts that fold out and create a larger surface area than the area available on any surface of the wearable data collection device 106 or the releasable peripheral attachment apparatus 102.

In some embodiments, a solar collection assembly 402 can be detached from the releasable peripheral attachment apparatus 102 and connected by some means of energy transfer such as a conductive wire. For instance, a solar collection assembly can be built into a hat, a visor, or other clothing item, thereby adding large and conveniently placed solar collection ability.

Figure 4E:
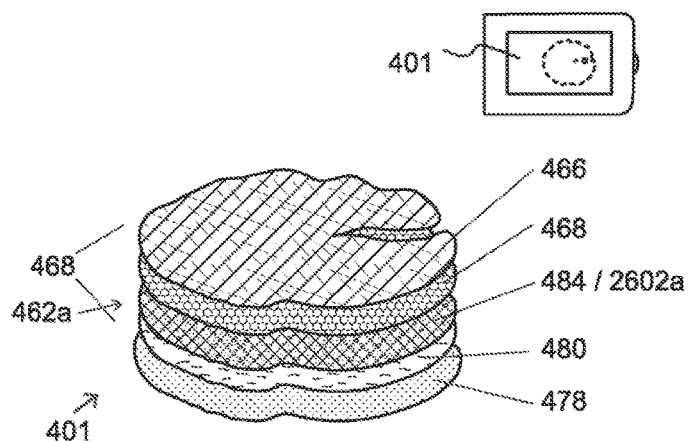

FIG. 4E is a schematic representation of an energy gathering unit 401, with the layers exploded in 3D. The layers are shown as if a roughly circular core was cut and removed from a multi-layer energy-gathering unit 401, so that the layers can be clearly seen. This is the depiction that will be used for further embodiments, below. In this depiction the bottom layer is the unit substrate 478. Above it are several layers, which taken as a whole form the energy-gathering complex 468. An energy-gathering complex includes one or more energy-gathering assembly 462, as well as assistive layers. In the embodiment represented in FIG. 4E, there is only a first energy-gathering assembly 462a, which may be a photovoltaic complex 484. Assistive layers include a backing layer 480 between the unit substrate 478 and the first energy-gathering assembly 462a. Above that is an upper layer 468. This layer 468 embraces several possible layers including a one-way mirror layer 2536 but also other coatings that can be positioned over a photovoltaic complex 484. Above that is a finish layer 466, which also can embrace several types of layers including a reflective or refractive layer 2532.

Figure 4F:
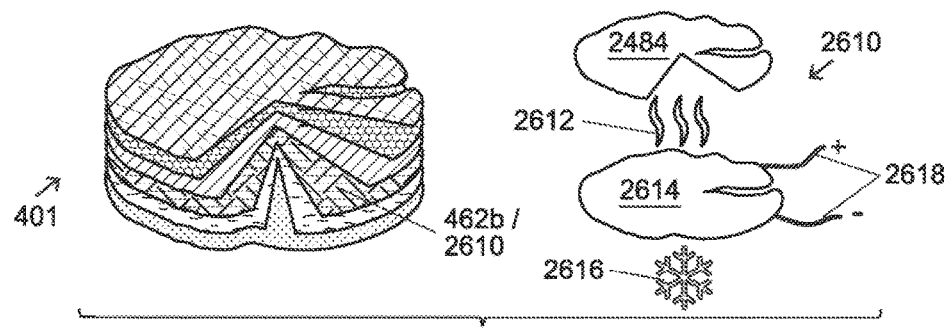
Figure 4G:
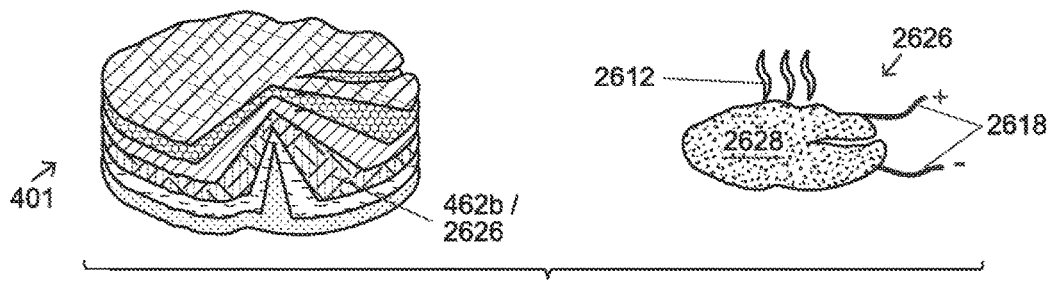
Figure 4H:
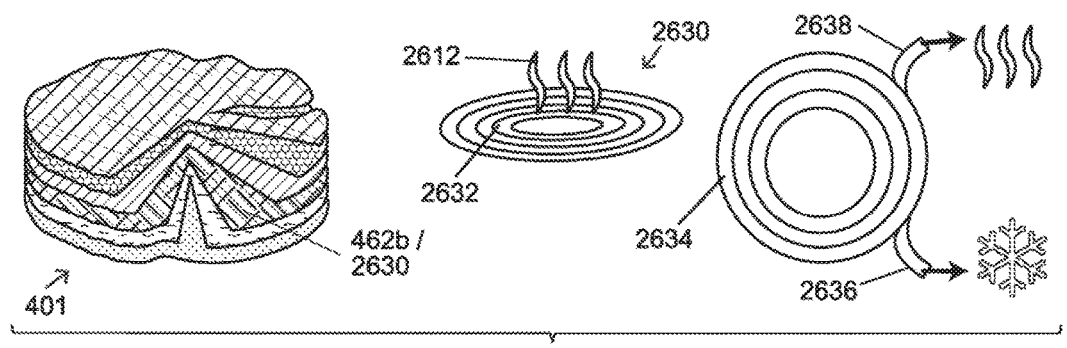
Figure 4I:
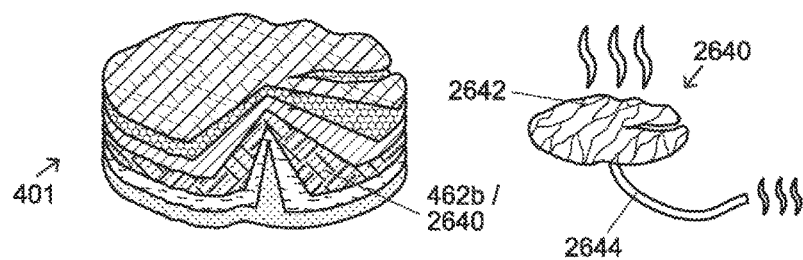
Figure 4J:
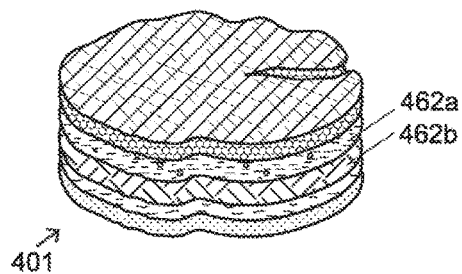

FIG. 4I is a schematic representation of an energy-gathering unit 401, with the several layers from FIG. 4E further collapsed (though not drawn to scale), and with a second energy-gathering assembly 462b interposed amongst the layers, below the first energy-gathering assembly 462a.

In the sections below, many variants of a second energy-gathering unit 462b are described.

Additional Examples of Energy-Gathering Unit—Other Than Photovoltaics

Thus far, the energy-gathering units 401 that have been described only produce electricity, and they do so based on sunlight, via the photoelectric effect. The present technology contemplates a much broader scope. The description has been constrained to photoelectric production of electricity in order to focus on the detailed structure of one embodiment of the present technology.

All of the permutations of the embodiment, as described above or below, for individual apparatuses or for networks, shall be considered as applying to any of the further embodiments below of an energy-gathering unit 401 but which utilize more than the photoelectric effect. In turn, all of those embodiments, as well as all of the categories of embodiment that utilize more than the photoelectric effect, shall be considered as applying to all the embodiments described much below.

The families of embodiments described in this section all can be thought of as iterations on energy-gathering unit 401 used to gather energy from their environment in additional ways. These are schematically represented in FIG. 4E through 4J, and described below.

In these figures, the various layers, coatings, devices, or other elements included or amended in each family of embodiments are schematic and not literal, in particular their thickness or extent are not drawn to scale. In particular their thickness is not to scale relative to the thickness of the unit substrate 478 nor relative to the thicknesses of each other layer or element.

Thermoelectric

FIG. 4F schematically represents a family of embodiments wherein the energy-gathering unit 401 has, in addition to the photovoltaic complex 484, a means for gathering energy in the form of electricity, via the thermoelectric effect. In these embodiments, a second energy-gathering assembly 462b is a thermoelectric complex 2610. A substance that exhibits the thermoelectric effect (which has subtle variants) will develop a charge separation when one side of it is heated while the other side is cool relative to the heated side. The larger the temperature separation, the larger the charge separation. In this way, if a thermoelectric substance is arranged such that a top surface receives an appreciable amount of heat, and a bottom surface is in contact with a relatively cool substance that has a high thermal conductivity and high heat capacity, then heat will be drawn away efficiently from the bottom surface and the temperature separation will be maintained and the thermoelectric substance will continue to generate electricity, for instance all through the day.

The conditions of an energy-gathering unit 401 on a wearable device, are ideal for thermoelectric generation. In an example embodiment (FIG. 4F, middle), a thermoelectric sheet 2614 is positioned beneath the photovoltaic complex 484. Photovoltaic materials generate heat when in use. The heat comes from light that is absorbed by the photovoltaic material but is not converted to electricity by the photoelectric effect. In this case, the operating heat 2612 transfers to the upper surface of the thermoelectric sheet 2614. Meanwhile, the bottom surface of the thermoelectric sheet 2614 is continually exposed to relatively cool conditions 2616 by the inert plastic below. This heat differential drives the thermoelectric effect, especially the Seebeck effect, and an electric charge is generated. Conductive leads 2618 are arranged to conduct this charge, and it is combined with output of any other energy-gathering assemblies 462 such as the photovoltaic assembly 484 in this embodiment.

In another example embodiment (not mutually exclusive with the thermal conductor patch 2620 method), a heat sink assembly 2624 is arranged below or at a short distance from the unit. The heat sink assembly 2624 efficiently dissipates heat from the thermoelectric sheet, thus driving the thermoelectric effect. Heat is conducted to the heat sink assembly 2624 from the underside of the thermoelectric sheet 2614 via a stalk 2408 which is modified to contain a heat pipe 2622. The heat pipe is an extruded member alike a water pipe or a thick wire, made of or containing material(s) with high thermal conductivity. The material or another member can flare outward from the stalk coupling junction to create a sheet under the thermoelectric sheet 2614, acting as a funnel for heat, to conduct heat from the thermoelectric sheet 2614 into the heat pipe 2622.

Materials to be used for thermoelectric generation include all thermoelectric materials currently and to be developed, include lead telluride, bismuth telluride, bimetallic junction material, carbon nanotube/polymer materials, graphene nanomaterials, and others. Thermoelectric generators are usually rigid structures. In the present technology, the thermoelectric sheet can also be thin and flexible. To achieve this, materials such as tellurides and graphene materials are coated in a thin coat on a membrane, and the whole assemble can be flexed. Also, such materials can be arranged in a series of smaller strips so that they flex past each other when the assembly is bent or perturbed. This can assist with the wiring/circuitry, as a plurality of smaller generators can be arranged in a circuit to address impedance limitations. Future thermoelectric materials will have greater efficiency and greater flexibility and are incorporated here.

Even after sunlight or other light is removed, some heat will remain in the photovoltaic and other layers, and therefore these embodiments can generate electricity a little bit longer after dark than pure photovoltaic devices. This smoothing of the production time further across the day-night cycle can be exaggerated if a heat reservoir is interposed between the photovoltaic complex 484 and the thermoelectric complex 2610. This arrangement is of particular use in other embodiments covered below, where the apparatus 2400 is larger and/or more rigid, and can hide a larger heat reservoir.

Pyroelectric

FIG. 4G schematically represents a family of embodiments wherein the energy-gathering unit 401 has, in addition to photovoltaic complex 484, a means for gathering energy in the form of electricity, via the pyroelectric effect. In these embodiments, the second energy-gathering assembly 462b is a pyroelectric complex 2626. Pyroelectric materials generate an electrical charge whenever they are subjected a change in temperature. They do not need the temperature gradient that thermoelectric species do but they do require changes in temperature.

In some example embodiments, the pyroelectric complex 2626 includes a sheet of pyroelectric material 2628, and conductors 2618 arranged to conduct the charge generated by the sheet 2628.

Artificial pyroelectric materials can be made in a thin-film configuration, which is beneficial for the present embodiments. Some pyroelectric materials that can be used include but are not limited to: polyvinylidene fluoride, gallium nitride, polyvinyl fluorides, cesium nitrate, lithium tantalate (e.g., produced by the Czochralski method), cobalt phthalocyanine, PZT, triglycine sulfate, lead zirconate, strontium barium niobate, PVDF, barium titanate, lithium sulfate monohydrate, and other pyroelectric materials.

During normal functioning, temperatures in energy-gathering units 401 are likely to fluctuate and these fluctuations can be converted to electricity by the pyroelectric complex 2626. Particularly, when passing cloud or passing shadows cause a decrease in sunlight and thus in the output of the photoelectric complex 484, a commensurate fluctuation in operating temperature is converted to an increased output from the pyroelectrical complex 2626. Thus, the two subsystems complement each other, especially when there are frequent fluctuations in illumination such as on days with an abundance of "fair-weather" cumulus clouds in otherwise blue sky. Temperature changes related to proximity to a human body, and to physical activity, can also drive the pyroelectric effect.

Solar Thermal

FIG. 4H schematically represents a family of embodiments wherein the energy-gathering unit 401 has, in addition to photovoltaic complex 484, a means for gathering energy in the form of heat, via thermal exchange using a fluid pumped into the unit structure unheated and returned to a heat-exchanger heated. In these embodiments, the second energy-gathering assembly 462b is a fluid-exchange solar thermal complex 2630. These embodiments are particularly well suited to larger units 401, such as in the configurations discussed herein where a solar collection assembly 402 is arranged distally, e.g. on a hat or other surface.

In some embodiments, the fluid-exchange solar thermal complex 2630 includes a heat exchanger layer 2632, which in turn includes a spiral-tube heat exchange assembly 2634. Relatively cold fluid (e.g. water or other fluid—liquid or gas) is pumped into an intake tube 2636. The cold fluid circulates through the spiral piping of the heat exchange assembly 2634, gradually being heated by the heat 2612 generated in overlying layers. Eventually the fluid passes all the way through and exists the fluid output tube 2638. At this point in time, the exiting fluid carries with it usable heat. The heat in some embodiments is used to heat the body of water in which it is placed, and in some embodiments it is used in order to heat a home or a commercial structure, or in other ways impart its heat in a useful way. The piping of the heat exchanged 2634 is flexible and soft.

FIG. 6F schematically represents a family of embodiments wherein the energy-gathering unit 401 has, in addition to photovoltaic complex 484, a means for gathering energy in the form of heat, via thermal conduction along a heat pipe. In these embodiments, the second energy-gathering assembly 462b is a solid-state solar thermal complex 2640. The solid-state thermal complex 2640 includes a heat reservoir 2642 made of some solid or fluid material that can absorb a relatively large amount of heat.

Connected to the heat reservoir 2642, in this example embodiment, is a heat pipe assembly 2644. The heat pipe assembly can be integrated within the stalk 2408, as a flexible tube or pipe of a solid, gel, paste, liquid, gas, powder, or other substance, which can conduct heat sufficiently to draw it away from the heat reservoir and thereby draw it away from heat-generating components of the unit 401 such as a photovoltaic complex 484. The heat pipe assembly 2644 may include or be attached to a heat sink 2624 or similar heat disperser. The heat pipe assembly 2644 may conduct heat to a base unit such as the swappable portion 102b, where it can be combined with heat drawn from other structures and there utilized. Heat may also be used for other purposes such as to drive chemical reactions, to drive a Stirling engine, or other purposes.

Radio-Frequency (RF) and Other Electromagnetic Radiation

Figure 4K:
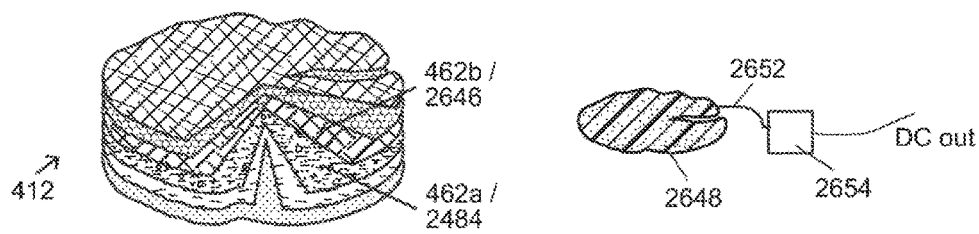
FIGS. 4K through 4M illustrate additional example internal configurations of a solar collection component, such as the solar collection components illustrated in FIGS. 4A through 4C, including supplemental energy collecting components.

FIG. 4K schematically represents a family of embodiments wherein the energy-gathering unit 401 has, in addition to photovoltaic complex 484, a means for gathering energy in the form of electricity, via analog reception of radio-frequency (RF) and other ambient electromagnetic signals (em). In these embodiments, the second energy-gathering assembly 462b is a radio-frequency (RF) and other em receiver and conversion complex 2646. Note that here the second assembly 462b is placed physically above the first assembly 462a, because the second assembly 462b, as an em receiver and conversion complex 2646, a.) should not be blocked by the circuitry of a photovoltaic complex 484, and b.) can be configured to transmit a large proportion of incoming light.

Embodiments of an energy-gathering unit 401 that include an em receiver and conversion complex 2646 can be configured, in whole or in part, to harvest electromagnetic radiation that is found in our everyday environment, whether from natural or man-made sources. FIG. 4K, right, depicts a schematic representation of an energy-gathering unit 401 that is an example energy-gathering unit for harvesting em radiation.

The energy-gathering unit 401, in this embodiment, has a series of conductive filaments 2648 (which can be wires) that can act as an analog antenna/receiver. The conductive filament can be a so called "nantenna" which is a nanoscale antenna and can be printed directly onto a substrate, in this case onto a layer of the leaf 401. Additional embodiments employ wire "coils", for instance in a flat annular coil arrangement on the surface layer of an em receiver and conversion complex.

Harvesting of em radiation can begin with receiving electromagnetic signals by way of the filament structures 2648. These signals are conducted to a rectifying and smoothing circuit 2654 by way of a wire 2652. Next, DC electrical output is conducted from the rectifying and smoothing circuit 2654 to downstream elements as described above, for instance charge controller circuits, batteries, and inverters.

The conductive filaments 2648 can be fabricated from a wide variety of conductive substances. Some embodiments utilize Mu Metal for the filaments 2648, because it very efficiently channels magnetic fields and it can absorb RF very well. In this manner, mu metal is useful for achieving better energy harvesting, and also for better shielding.

Shielding in some cases is useful for protecting the device from which emissions are being harvested—for instance by creating a faraday screen for a computer or other installation. Shielding in some cases is about protecting the environment or people from emissions—for instance by absorbing or shunting EM emissions from power substations. That is to say, an installation of apparatuses 2400 that incorporate em receiver and conversion complexes 2646 into their energy-gathering units 401 can have the effect of absorbing stray em radiation, and thereby protecting people, e.g. from cancer.

Fiber Optics and Other Light-Channeling

Figure 4L:
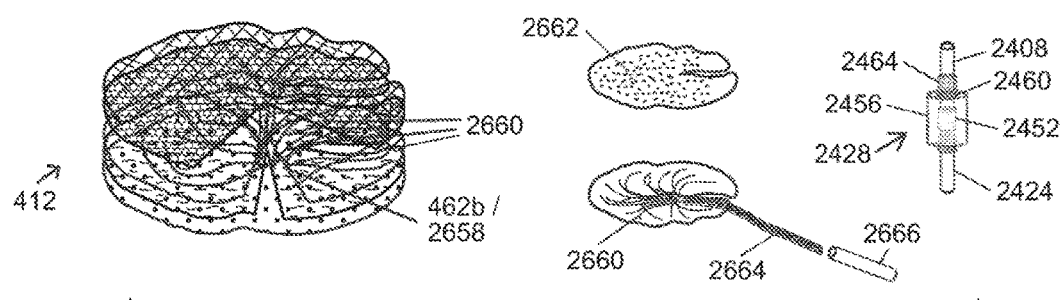

FIG. 4L schematically represents a family of embodiments wherein the energy-gathering unit 401 has a means for gathering energy in the form of electricity, via the photovoltaic effect, but with a different configuration than in previous embodiments. Namely, fiber optic cables and/or light pipes are used to conduct sunlight away from the surface of the unit 401, and the light is converted to electricity in a remote location. The optical fibers within the energy-gathering unit 401, collectively, are considered an optical light-channeling complex 2658.

In some embodiments, the system uses light channeling to concentrate received light onto photovoltaic cells. In one scheme, energy-gathering units 401 do not have any photovoltaic materials on them (note the missing photovoltaic complex 484 in FIG. 4L). Instead, fiber optic strands 2660 transport light that hits the energy-gathering unit to the base unit 2436, and the photovoltaic conversion of light to electricity is carried out there.

Referring to FIG. 4L, upper right, fiber optic strands 2660 originate at or near the outermost surface of the unit 401 and extend through and along the inner layers of the unit 401. Such fiber optic strands 2660 can transport light from all over the surface. Fiber endings 2662 are represented on a top surface of a representative unit 401, showing a broad and even distribution across the surface. An arbitrarily high number of optical fibers 2660 can be incorporated into the material of a unit 401 in the light-channeling complex 2658. On the bottom surface (noted in figure), the corresponding fibers extend from the widely and evenly distributed points toward a central region near the pad coupling junction. This represents the first stage of aggregating light.

Fibers 2660 are organized into a fiber-optic bundle 2664, in this family of embodiments. The fiber optic bundle 2664 can extend down a stalk 2408, in conjunction with any electrical conductors/wires that may also extend down the stalk 2408. Additionally or alternatively, fibers 2660 or the fiber optic bundle 2664 can terminate in a light tunnel 2666. A light tunnel 2666 carries light the way a water pipe carries water. It has extremely highly reflective walls and thus can transport light with little loss, alike a very thick fiber-optic cable. An advantage of using a light tunnel is that the fiber optic strands 2660 do not need to run the entire length of the stalk 2408 (which, remember, is a variable length). Another advantage is that a single light-conducting structure can remain in place even while different pads 401 or other energy-gathering units 401 are attached or swapped. These measures can reduce cost, increase interchangeability of parts, increase interoperability, and/or allow greater flexibility in several ways.

A modified coupling junction 2428 is also represented in FIG. 4L. The modified version of the coupling junction 2428 allows for coupling of stalks 2408 and/or stalk extender segments 2424 that include bundles 2664 of optical fibers. A modified coupling junction 2428 can also allow the coupling of stalks 2408 and/or stalk extender segments 2424 that include light tunnels 2666, in another type of embodiment. These coupling junctions also connect whatever electrical wires may concurrently be in the stalks 2408.

Light is conducted down the stalk 2408 via the mechanisms above, and ends up at the base unit 2436. Within the base unit 2436, in these embodiments, light is conducted from the light tunnel 2666 or fiber optic bundle 2664 of each stalk, through the base coupling junctions. From there it is conducted into an inner light chamber 2668 via optical connectors from the base coupling junctions to inner coupling junctions on the fiber light chamber. Combined light 2670 from all units 401 is introduced into the light chamber 2668.

Light conversion is carried out in the light chamber 2668. For instance, a solar cell 2672 may be placed inside the light chamber 2668, in some embodiments. In other embodiments, the inside surface of the light chamber is coated with thin-film photovoltaic materials, and wired up according to ordinary practice, such that current generated by the photovoltaic material is conducted to usual downstream elements.

A light chamber 2668 in the present embodiments, namely a small unit worn on or about the head, would have to be small. However, other embodiments may have more practical sizes and constraints. Furthermore, a light chamber can be arbitrarily far away from the light source, which is one of its advantages. In this manner, it could be in a pack work on a belt or in a back-pack or as part of standard-issue clothing, or even in a chamber in the sole of a shoe. Overall, there is flexibility as to location.

As stressed elsewhere, an apparatus 2400 can have multiple means of gathering energy, from multiple sources. Accordingly, a base unit 2436 that is modified to include a light chamber and the circuitry to harvest useful energy from the resulting concentrated light can also still have circuitry to handle output from other systems that are integrated into the apparatus 2400 or energy-gathering units 401.

Accordingly the base unit 2436 in FIG. 4L, in various embodiments, includes electrical components that can be used for the output of both the light-channeled photovoltaic system as well as other systems such an em receiver and absorption complex 2646. Such elements can include a rectifier 2512, charge controller 2516, electricity storage device 2520, and/or inverter 2524, all connected by appropriate wires with both the light chamber output and any electrical input coming from the stalks.

Current photovoltaic materials are low in efficiency but are improving rapidly. Fiber optics and light tunnels are nearly perfectly efficient, and are not rapidly improving (except in cost). Therefore, it may be advantageous, in some embodiments, to fashion the permanent parts of the system with the fully-mature and efficient components, the fiber optics, and to allow the relatively early-stage and evolving photovoltaic part to be replaceable in the future. In the future, photovoltaic materials in the light chambers can be replaced, or for instance the entire base unit 2436 can be replaced. Additionally, hiding the light chamber 2668 out of site means that traditional solar cells and panels can be used, and they are generally cheaper, mostly due to scale. For instance, a traditional monocrystalline silicon photovoltaic cell or panel can be inserted into the light chamber in order to do the conversion to electricity with the greatest simplicity and lowest cost.

Figure 4M:
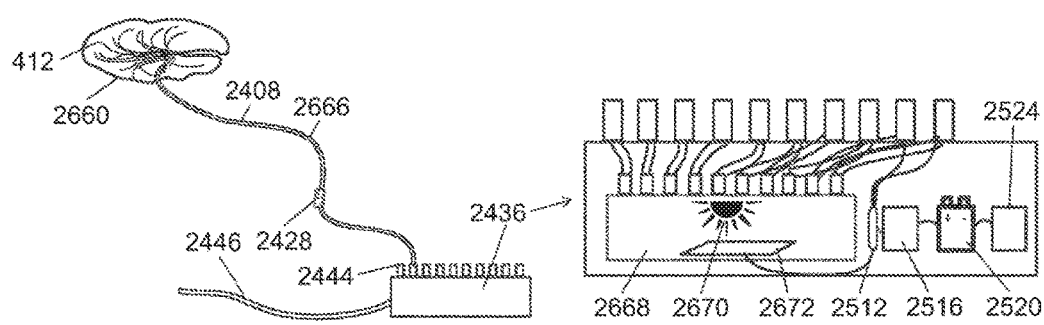
Figure 4M:
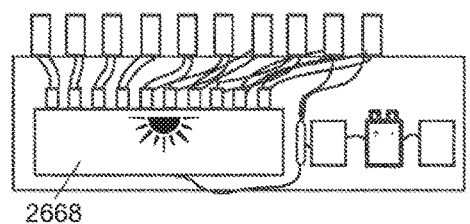

FIG. 4M schematically represents a family of embodiments wherein the energy-gathering unit 401 has a means for gathering energy in the form of heat, but with a different configuration than in previous embodiments. Namely, fiber optic cables and/or light pipes are used to conduct sunlight away from the surface of the unit 401, and the light is there used to heat a substance.

This family of embodiments is similar to the one above, as described in reference to FIG. 4L. Therefore, the drawing and description here focus solely on those aspects that differ. Referring to FIG. 4M, again all light collected by units 401 is combined in the light chamber 2668. In contrast to the embodiments represented by FIG. 4L, the light chamber is used for gathering energy in the form of heat. Here, all means for gathering useful energy from heat as described above (for instance in reference to FIG. 4H and FIG. 4I) also apply to heat that may be generated within the light chamber.

It is natural to combine the latter two families of embodiments, and for instance to provide a system with a light chamber as above, having photovoltaic as well as heat-based means. For instance, the light chamber can be lined with thin-film photovoltaic material and/or may have silicon solar cells within it. Beneath and near these can be thermoelectric and/or pyroelectric materials, arranged analogously to what is described above. Furthermore, heat pipes and/or heat sinks can conduct remaining heat from the base unit. The heat can be used as described above, for instance to heat the water in the immediate vicinity and/or to heat other structures or to drive chemical reactions or the like.

Note that this system and all embodiments utilizing light-channeling can use the light-channeling means in both directions. That is to say, that light introduced at the light chamber 2668 is conducted to the other end of fiber optic strands 2660. Therefore, some embodiments have a light bulb or light-emitting diode placed in the light chamber or otherwise in an arrangement such that it can produce light that will reach the fiber optic strands. In these embodiments, as an example, energy gathered during the day can be used in part to power a light-emitting device, and the light can emanate to the surface of the energy-gathering unit 401 for visual effect or for safety lighting or the like. Indeed, all of these embodiments are self-lighting and can provide safety lighting, decoration, signage, or other types and uses of lighting.

Such embodiments, as in all cases, can be combined with all the other alternative embodiments described elsewhere, in any combination.

Combining and Integrating Multiple Means of Harnessing Energy from the Environment In each of the families of embodiments represented in FIGS. 4D through 4M, a single additional mode of energy-gathering is added to the energy-gathering unit 401. A representative means for this mode is represented in addition to an embodiment of the basic photovoltaic means (photovoltaic complex 484) as described above. However, it should be understood that a.) the additional alternate energy-gathering means can stand on its own and a complete embodiment of the present technology may not include a photovoltaic energy-gathering means, and b.) any given alternate energy-gathering means can usually be combined and integrated with one or a plurality of additional energy-gathering means as described here, or other ones not described here.

That is to say, a single unit 401 might have three or four or more means of gathering energy from the environment simultaneously. These are integrated and form a harmonized energy-gathering unit 401. Within the energy-gathering unit, the energy-gathering complex 468 is the collection of all energy-gathering means, each of which is an energy-gathering assembly 468. For instance a first energy-gathering assembly 468a may be a photovoltaic complex 484, and a second energy-gathering assembly 468b may be a thermoelectric complex 2610, and a third energy-gathering assembly 468c may be an em receiver and conversion complex 2646.

These energy-gathering assemblies (collectively 462) are integrated, along with assistive layers, forming the energy-gathering complex 468 of the total energy-gathering unit 401. For instance, a single conducting infrastructure 2482 may be interposed between the first and second assemblies 462a and 462b and utilized to conduct output electricity, in one embodiment. Likewise, the em complex 2646 and photovoltaic complex 484 may physically contact the thermoelectric complex 2610 (directly or via heat pipes, for instance), thereby transferring to it the heat that results from their incomplete conversion of incoming radiation (which would otherwise be wasted as heat output into the environment). In these example ways, the several energy-gathering assemblies 462 within an energy-gathering unit 401 are not just physically integrated but are functionally (e.g. electrically and/or thermally) integrated. Many other embodiments of the technology that embrace multiple means of gathering alternative energy are also similarly integrated. Additional examples of photovoltaic technology are available in U.S. patent application Ser. No. 13/646,082 (Publication No. 20130118550) entitled "Infrastructure for Solar Power Installations" and filed Oct. 5, 2012, hereby incorporated by reference in its entirety.

Figure 5:
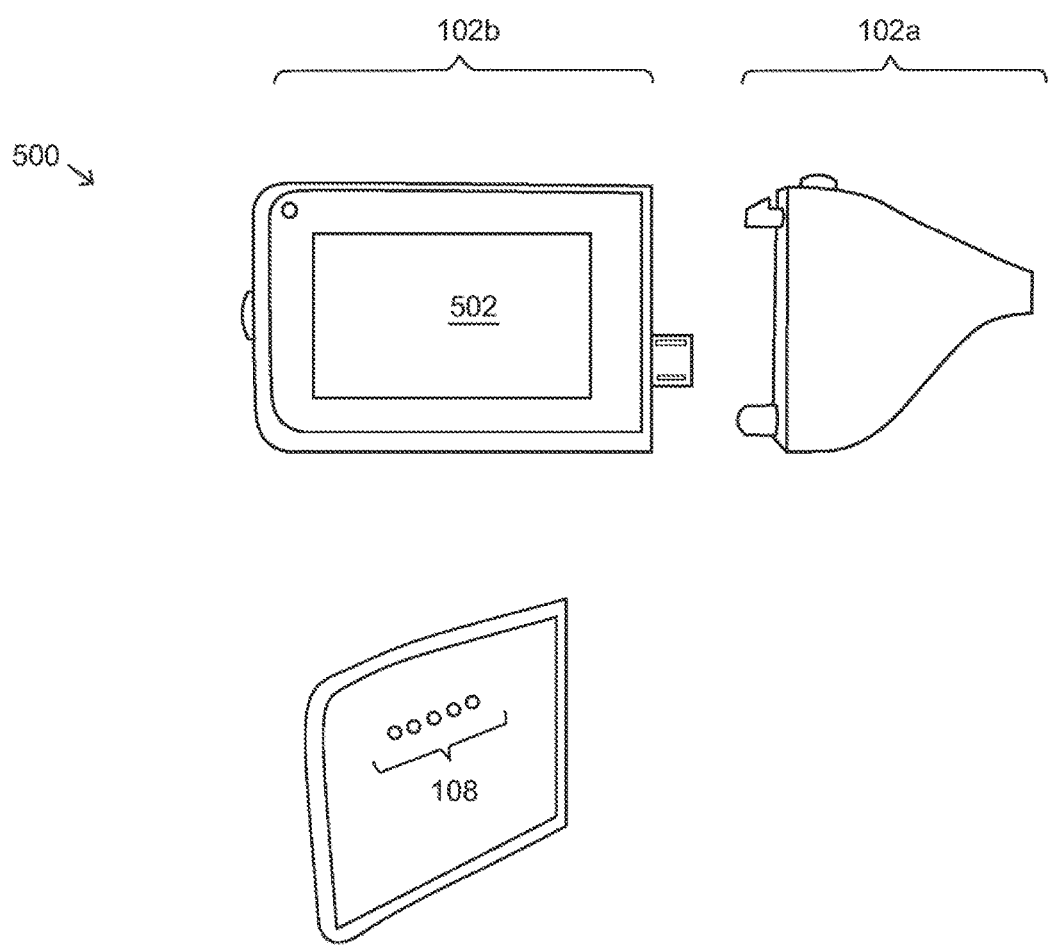
FIG. 5 illustrates a second example internal configuration of the releasable peripheral attachment apparatus of FIGS. 1A through 1D including a near field communication component.

FIG. 5 illustrates a second example internal configuration 500 of the releasable peripheral attachment apparatus of FIGS. 1A through 1D including a near field communication component 502. Near-field communication (NFC) functionality can allow the apparatus 102 to exchange data with mobile devices using the NFC standard. It can also be used specifically to allow another device or device running an app designed for this purpose to harvest data collected by the releasable peripheral attachment apparatus 102.

Figure 6:
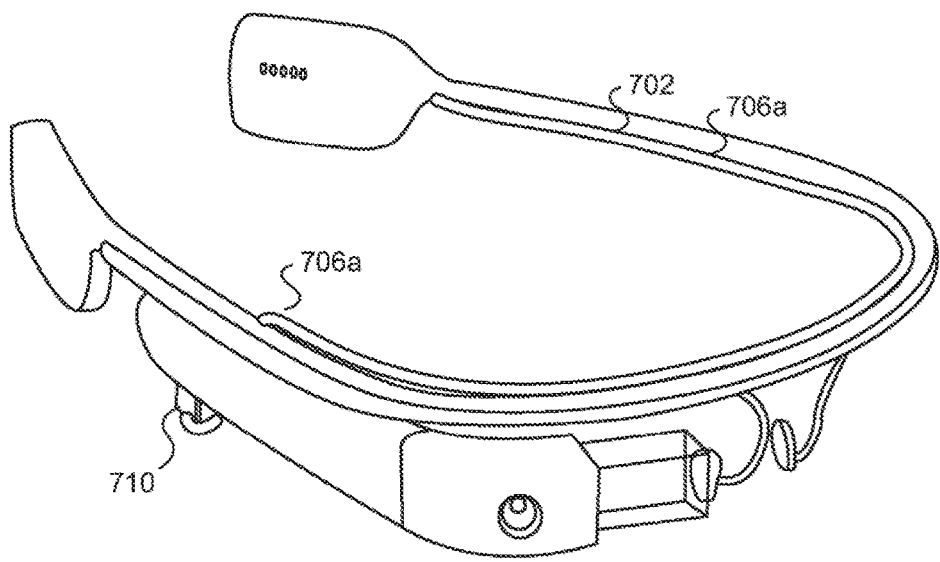
FIGS. 6 and 7 illustrate example power cord configurations of a power and/or data cord component for use with the releasable peripheral attachment apparatus of FIGS. 1A through 1D.
Figure 7:
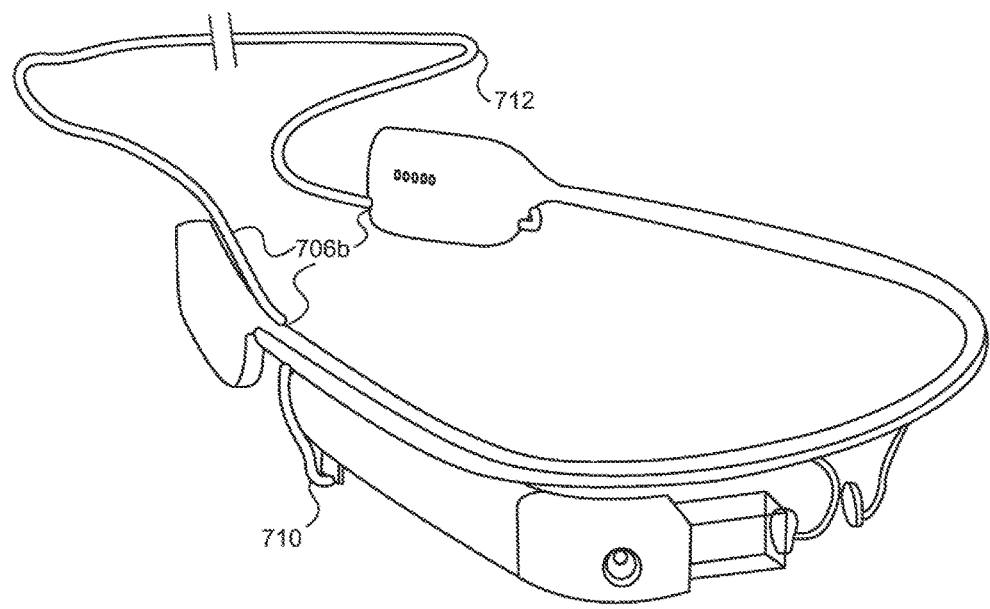

FIGS. 6 and 7 illustrate example power cord configurations of a power cord component for use with the releasable peripheral attachment apparatus of FIGS. 1A through 1D. FIG. 6 illustrates one method of linking an apparatus 102 to a device 106, namely with a power and data cord 702 that couples closely with the device 106 for instance by hugging the rim of a glasses form wearable data collection device 106. The power and data cord 702 can for instance be flat in configuration and can be adhered to the rim with a removable but strong adhesive 704 and/or held in place by clips or stays 706a. The power and data cord can be connected to a power and data port on the device 106 such as a microUSB port using a simple microUSB male connector ending of the cord 708 or a microUSB port splitter 710, which can be permanently attached to the power and data cord 702 or configured as a standalone piece that the cord 702 plugs into.

FIG. 7 illustrates one more method of linking apparatus 102 to device 106, namely with a power and data lanyard cord 712 that is similar to the cord 702 except that it is not attached closely to the device 106 and thus passing around the front of the head, but rather it is connected around the back of the head. In this way the lanyard cord acts as a lanyard or device to secure a pair of glasses or catch them if they fall, and provide a comfortable and convenient storage place (hanging around one's neck) when the glasses are removed. This is particularly important for highly expensive and fragile glass-type wearable data collection devices. The lanyard cord 712 is channeled via clips or stays 706b, for instance on the existing battery pod on a Google Glass® implementation, as illustrated, in order to provide stability.

Figure 13A:
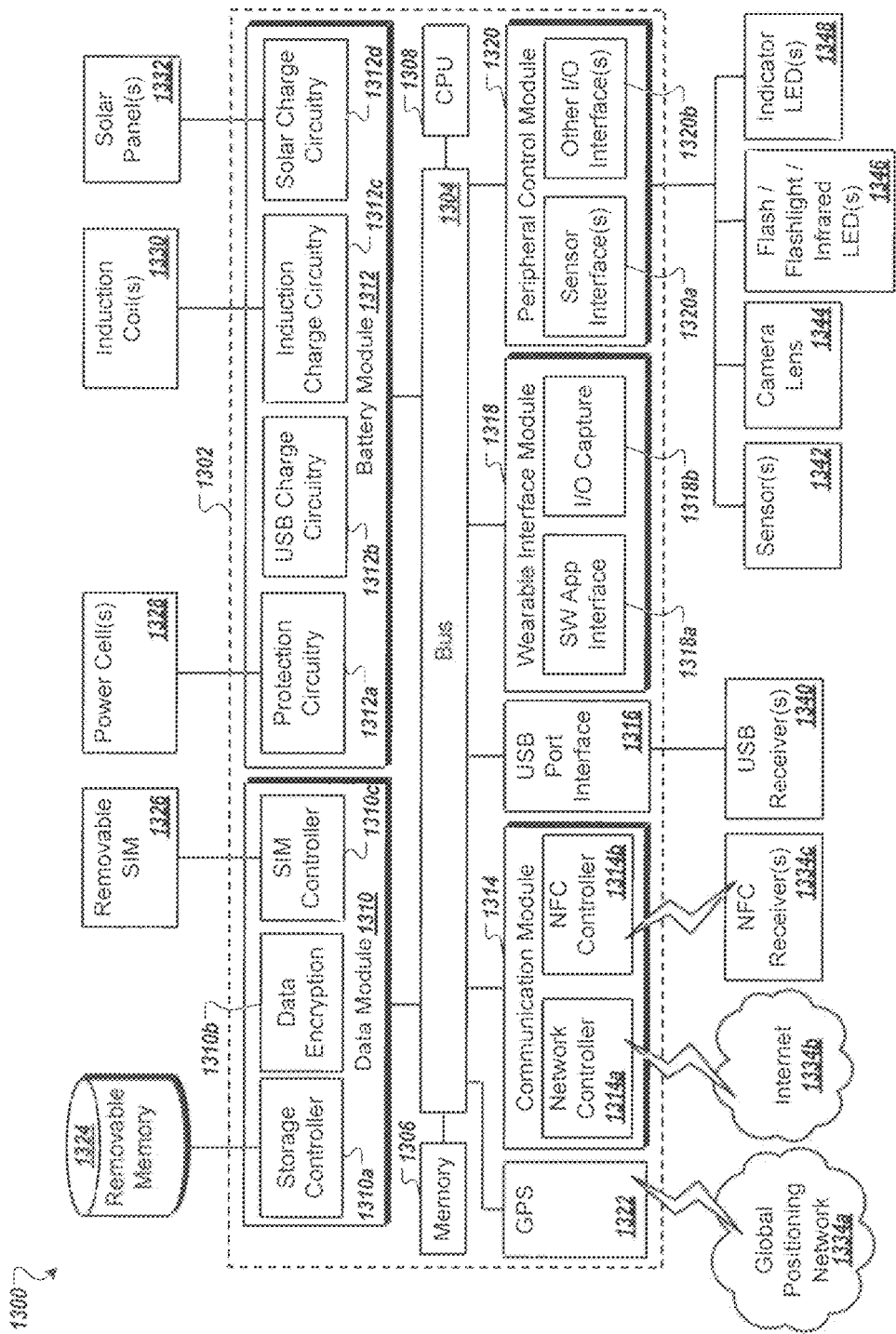
FIG. 13A is a block diagram of an example releasable peripheral attachment apparatus.

Returning to FIG. 1B, the camera port 112, in some implementations, provides a rear view camera feature for the wearable data collection device. The camera port, for example, may include a protective transparent covering to protect a camera lens, such as camera lens 1344 of a releasable peripheral attachment apparatus 1302 illustrated in FIG. 13A. Turning to FIG. 13A, image data may be collected by a camera driver connected to the camera lens 1344, for example included in the other I/O interfaces 1320b of a peripheral control module 1320. The camera driver of the peripheral control module 1320 may in turn communicate with a data module 1310 to store image data (e.g., in a removable memory 1324), a communication module 1314 to communicate image data externally to the releasable peripheral attachment apparatus, and/or a wearable interface module 1318 to communicate image data to the wearable data collection device. For example, a software application interface 1318a of the releasable peripheral attachment apparatus 1302 may communicate a video feed captured by the camera lens 1344 for display upon a heads up display feature of the wearable data communications device.

To enhance the camera feature of the releasable peripheral attachment apparatus, as illustrated in FIG. 1B, the illumination port 120a may provide rear view imaging illumination through one or more LEDs, such as one or more flashlight and/or infrared LEDs 1346 as illustrated in FIG. 13A. Turning to FIG. 13A, in one example, flashlight LEDs 1346 may be used to provide pulsed or static illumination for lighting images captured by the camera lens 1344. In another example, one or more infrared LEDs 1346 may be used to enable an infrared enabled camera driver (e.g., I/O interface 1320b) to function as a night vision camera.

In some implementations, the motion sensor port 120b of FIG. 1B may be used to trigger imaging activities based upon movements occurring behind a wearer of the wearable data communication device. For example, as illustrated in FIG. 13A, a motion sensor interface driver 1320a may analyze data collected by a motion sensor element 1342 presented at the motion sensor port 120b to identify objects or individuals approaching the wearer of the wearable data collection device 106 from behind. In one example, based upon identification of a potential threat (e.g., a fast moving car approaching a jogger or bicyclist donning the wearable data collection device), the sensor interface 1320a may supply image data and/or warning signals to the wearable data collection device 106 (e.g., via the software application interface 1318a of the wearable interface module 1318) to draw the attention of the wearer to the potential threat.

Figure 8A:
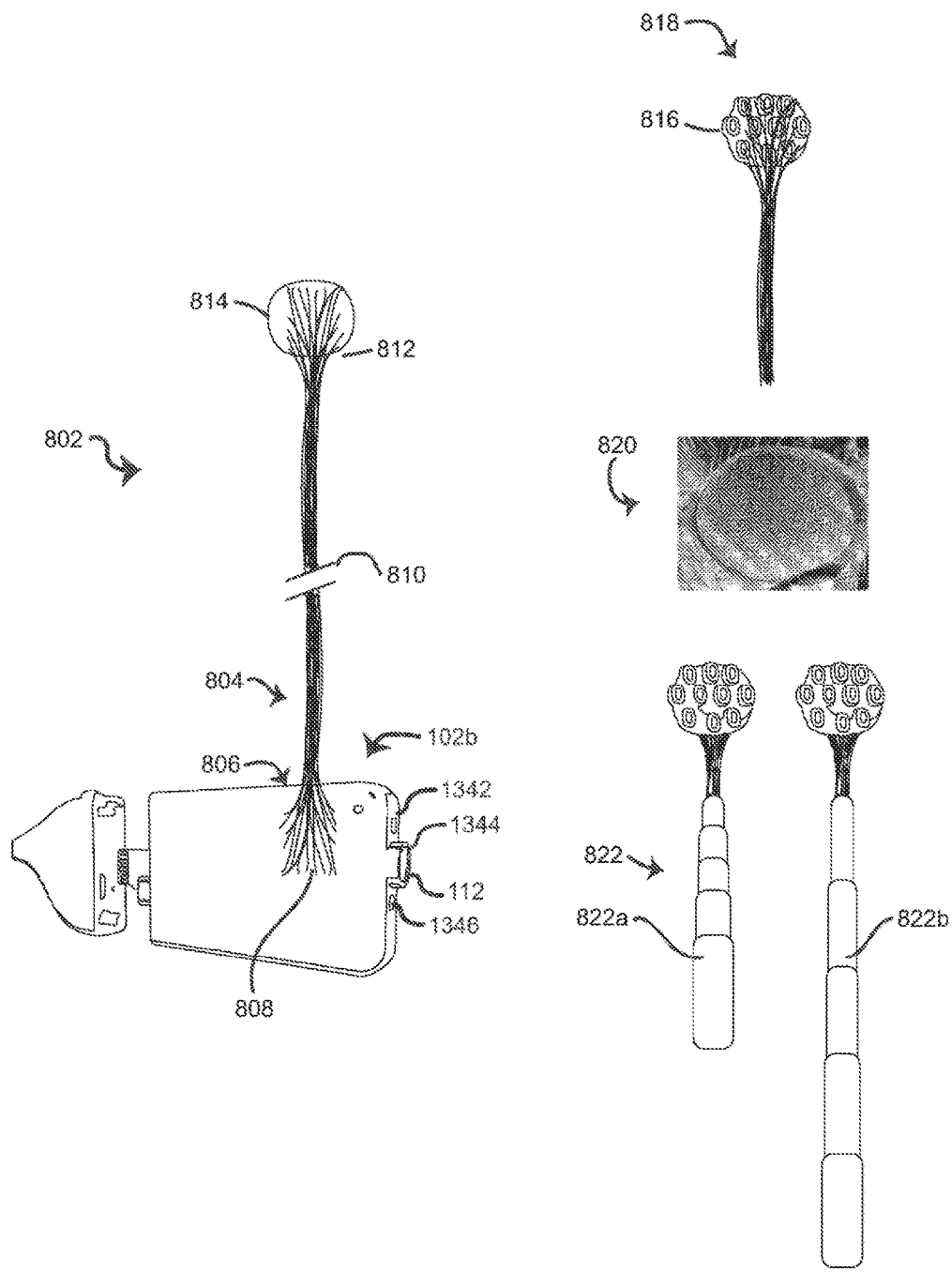
FIGS. 8A-8C illustrate an example antenna camera component for use with the releasable peripheral attachment apparatus of FIGS. 1A through 1D.

FIG. 8A illustrates an additional type of sensor that is an optional part of the releasable peripheral attachment apparatus 102. The sensor is here termed an antenna sensor 802 and it allows sensing (and projection) of electromagnetic radiation such as but not limited to human-perceptible or visible light, where gathering (or projection) of em radiation such as light takes place in a physically different place than the sensing (or generation) of em radiation such as light. This has an advantage that, for instance, em sensing (or projection) can take place in a location or configuration that would be hostile or inaccessible to the apparatus needed to sense (or generate) em radiation such as light. It also has the advantage of greatly reducing cost and device size, especially when the sensing (or projection) includes em radiation from multiple directions, such as would normally require multiple sensors or generators, since the nature of the antenna sensor 802 is that only one sensor or generator is required.

In one family of embodiments, for instance, an antenna sensor 802 may include a conductive stalk 804 that can conduct visible light and some other em radiation. In some configurations, the conductive stalk 804 can be composed of optical fibers. The conductive stalk 804 may be packed densely along much of its length, in some embodiments, and have a planar unwinding zone 806, where individual conductive elements such as optical fibers are separated from the dense configuration of the conductive stalk 806 into a pattern whereby the endings of the conductive elements form a 2D configuration such as a plane or a surface of some shape that may be close to planar. In some embodiments, the planar unwinding zone 806 terminates on an order-preserving planar surface substrate 808 that fixes the location of the endings of the individual conductive elements across physical space and preserves their location. For instance, optical fibers may be spread out onto a plane and rooted in place in an optically transparent plastic and configured so that they point perpendicular to the plane of the plastic, in one type of embodiment.

A conductive stalk 804 may be arbitrarily long. In FIG. 8A, the variable length is indicated by an ellipsis cut 810.

In some embodiments, for instance, the conductive stalk 804 may have a spherical unwinding zone 812, where individual conductive elements such as optical fibers are separated from the dense configuration of the conductive stalk 806 into a pattern whereby the endings of the conductive elements form a 2D configuration such as approximates the inner surface of a sphere or a segment of a sphere. In some embodiments, the spherical unwinding zone 812 terminates on an order-preserving spherical surface substrate 814 that fixes the location of the endings of the individual conductive elements across physical space and preserves their location. For instance, optical fibers may be spread out onto roughly the inner surface of a sphere and rooted in place in an optically transparent plastic and configured so that they point perpendicular to the curved surface of the plastic, in one type of embodiment.

In this manner, the individual conductive elements in such an embodiment are arranged to point outward perpendicularly in all directions, 360 degrees in all directions, or in some subset of those directions as described by some portion of a spherical surface.

As a result, in the case of visible light, light that arrives from any direction in a globe configuration around the point where the spherical surface substrate 814 is located, can be conducted by the conductive stalk 804, then reorganized to project onto a 2D planar surface (at the planar surface substrate). Thus light from the entire visual space in all directions can be carried remotely and transformed into a single rectangle of light.

In this way, if the em/light is pure luminance information from the world surrounding the gathering (or projection) end, then at the other end can be a rectangular map of luminance values—cataloging the entire sky and scene for instance, but arranged conveniently into a rectangle or similar simple surface. If the em/light is organized and patterned at the gathering (or projection) end, for instance focused by an array of lenses, in some embodiments, then not just luminance but an image will be presented to the individual conductive elements at the spherical surface substrate 814. Likewise, the image information will be transmitted along the conductive stalk 804, and rearranged at the planar unwinding zone 806 and planar surface substrate 808. In this way, an image of the entire visible world or scene can be relayed to a single rectangular surface, in some embodiments.

If an image sensor such as is found in a typical digital camera is arranged at the planar substrate 808, then it can detect an image with a single sensor, and remote from the point of acquisition but in real time, an image that corresponds to a full 'photosphere' view of the entire world or visual scene.

This means that the point of acquisition (the gathering end) does not require a whole array of cameras, which would be extremely expensive and volumetrically large as well as heavy. Rather, only a small dense globe of optical fibers, for instance, may be necessary.

Additionally, a lens array 818 comprised of lenses 816 pointed in many directions, would facilitate patterning of the em/light at the gathering end, to form images.

This configuration has some similarities to a compound eye 820 but also differs markedly.

Antenna sensors 802 can be configured, for instance, in telescoping arms 822 so that they can be less conspicuous when in retracted configuration 822a and yet more useful (as in a periscope) when in extended configuration 822b.

In the case of conductive stalks 804 made of optical fibers, the conduction of em/light is two-directional. Therefore, an image-projection device placed at the planar substrate 808 will result in an image being emanated from the gathering (or projecting) end.

Transmission in both directions can happen at the same time.

In some configurations, optical fibers are arranged at the planar substrate 808 with a rigorous and orderly spatial relationship to their arrangement at the spherical substrate 814. This would be more effortful and expensive to manufacture, but would result in a more easily interpretable planar image and mapping to the spherical world, and less scrambling, which means a lower-resolution image sensor would be needed to recover the image. However, even in a disorganized transform due to scrambling of the optical fibers, calibration will be possible, to determine the transform, pixel by pixel, of the planar image (or luminance map) to the spherical image (or luminance map).

Figure 8B:
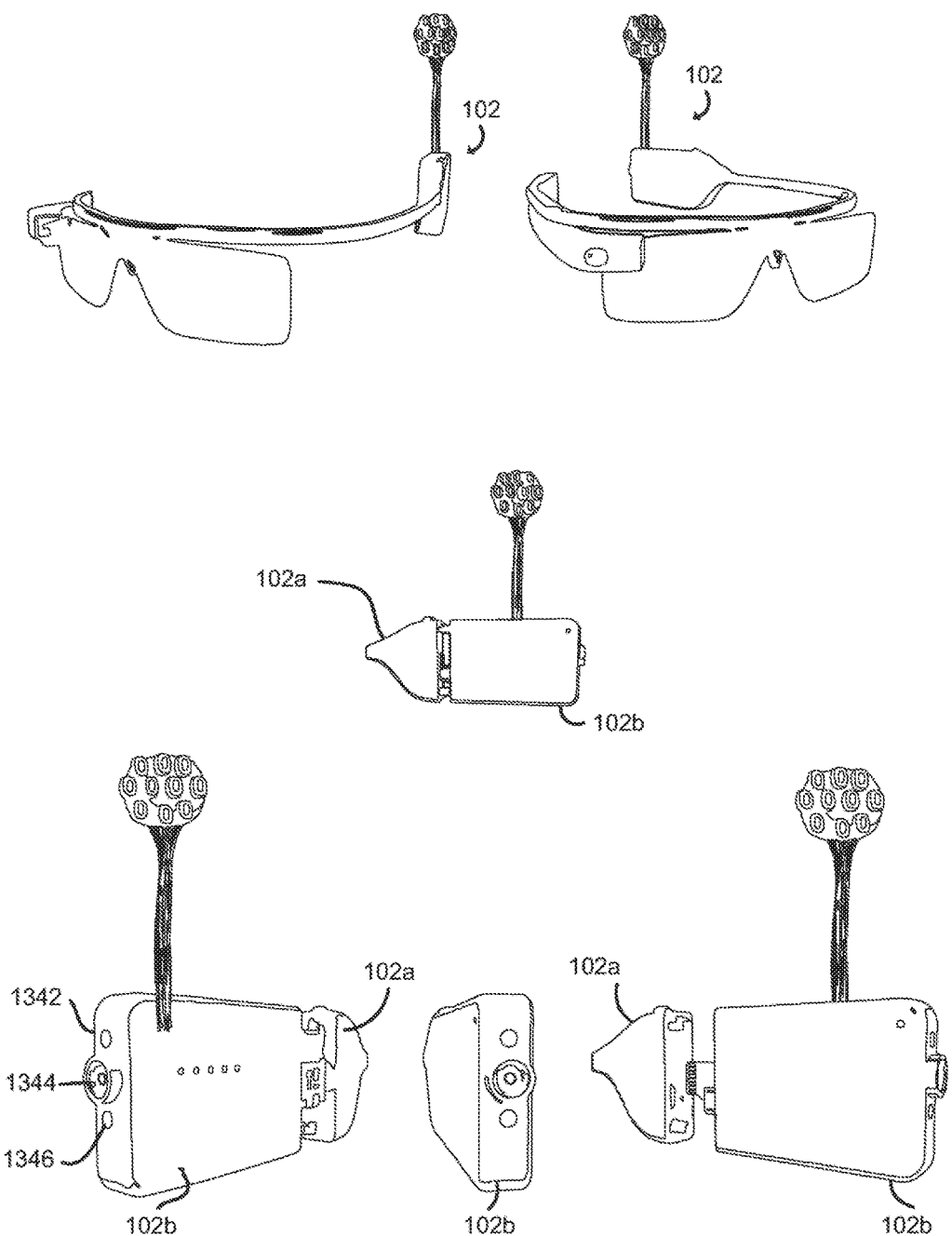
Figure 8C:
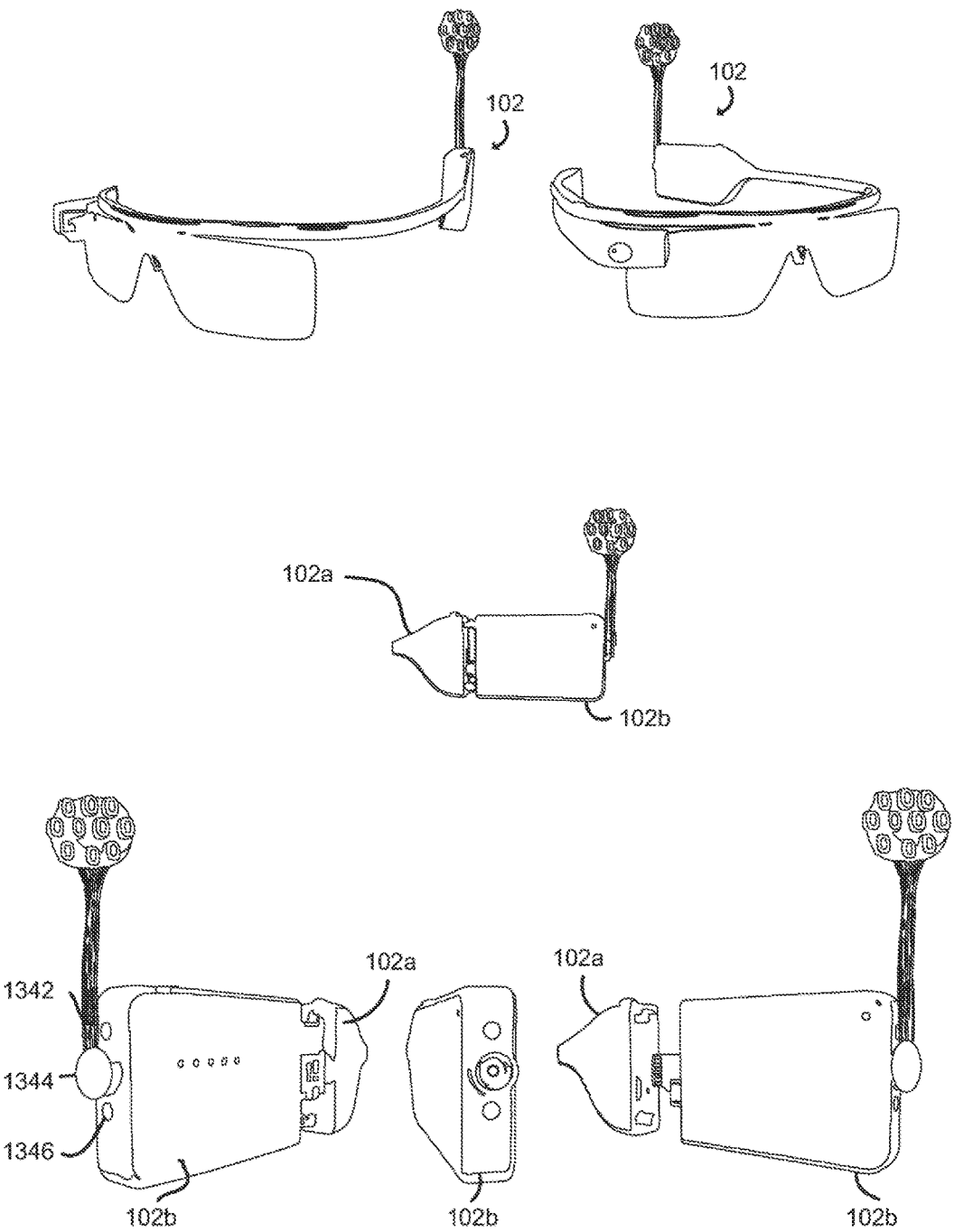

FIG. 8B illustrates representative embodiments where the antenna sensor 802 is integrated into the swappable portion 102b, which would contain a separate luminance or image sensor, and FIG. 8C illustrates some example embodiments where the antenna sensor is integrated into the rear-view camera 1344 via a coupling that can be detachable.

Figure 9A:
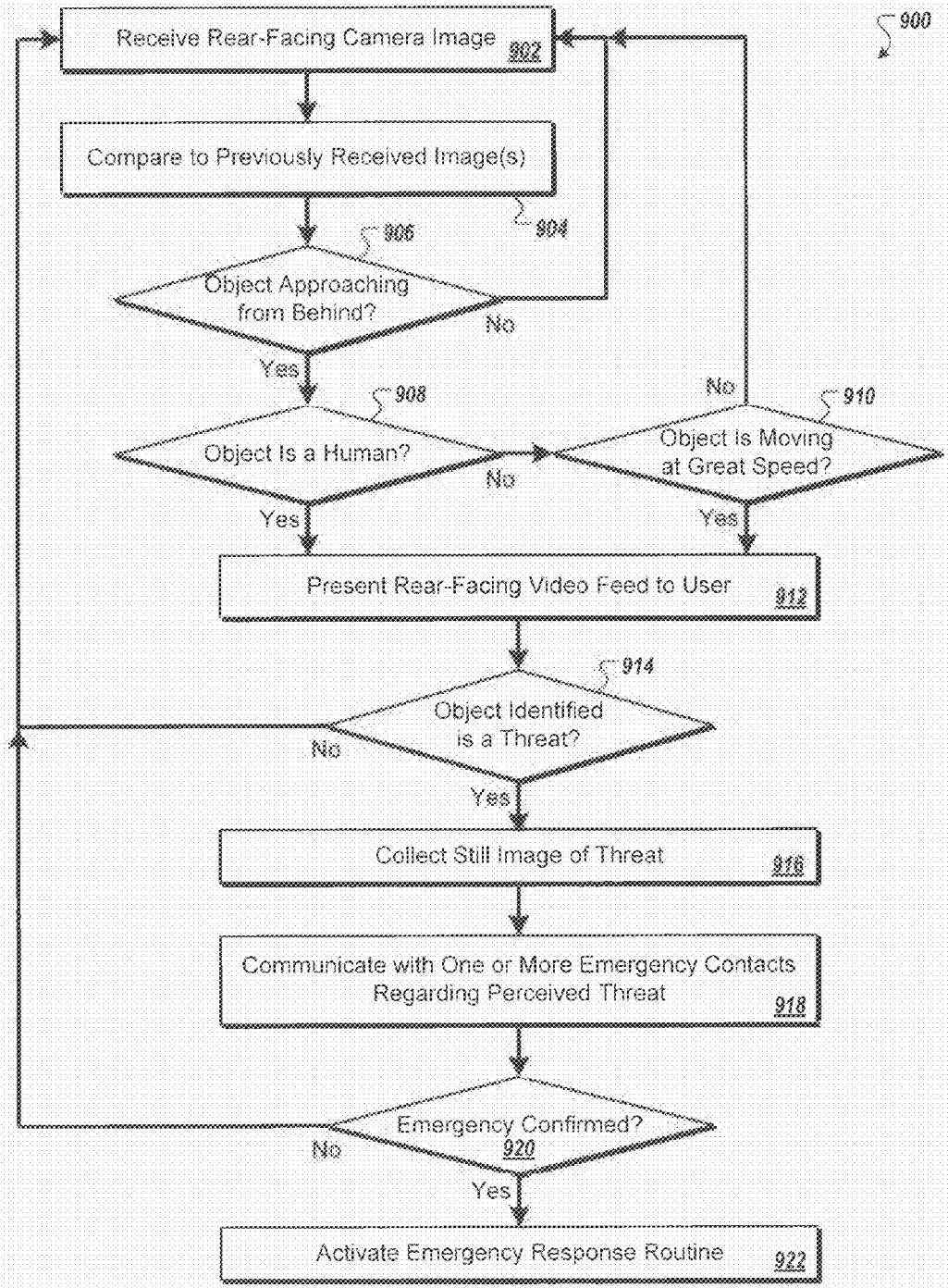
FIG. 9A is a flow chart of an example method for identifying and responding to an emergency or threat using a wearable data collection device 106 with a releasable peripheral attachment apparatus.

Turning to FIG. 9A, a flow chart illustrates an example method 900 for identifying and responding to an emergency or threat using a wearable data collection device 106 with a releasable peripheral attachment apparatus having a rear-view camera feature, such as the camera lens 112 of the releasable peripheral attachment apparatus 102 described in relation to FIG. 1B or the antenna sensor 802 described in relation to FIG. 8A.

Figure 13B:
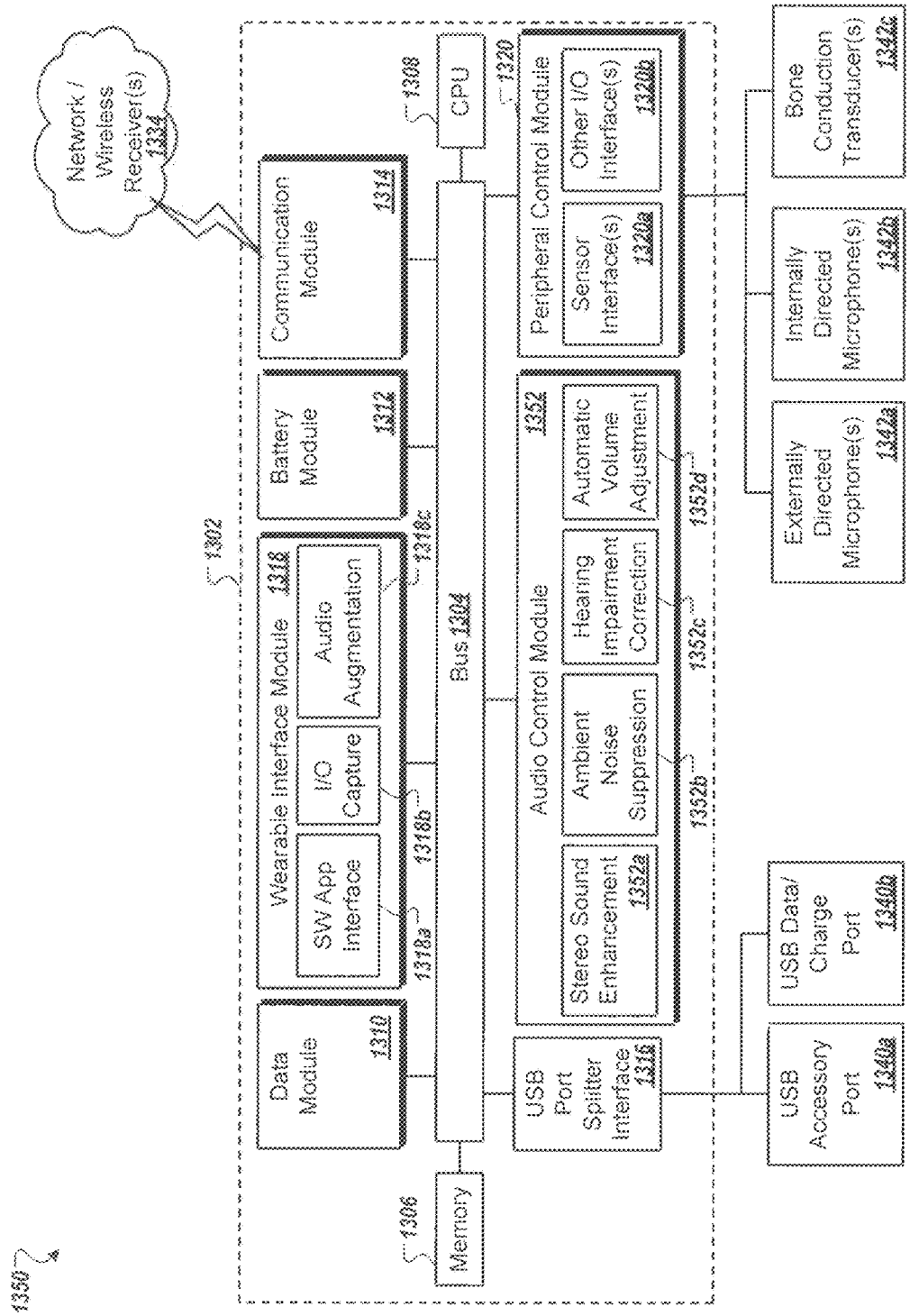
FIG. 13B is a block diagram of the releasable peripheral attachment apparatus of FIG. 13A configured with audio enhancement components.

In some implementations, the method 900 begins with receiving one or more rear-facing camera images (902). The images, for example, may be received by a software algorithm executing upon a CPU 1308 of the releasable peripheral attachment apparatus 1302 of FIG. 13A. In another example, the images may be received by a software algorithm executing upon a wearable data collection device. Furthermore, in other embodiments the images may be received by a software algorithm executing upon a computing device, such as a network server, smart phone, or other networked computing device in communication with a wearable data collection device 106 and/or the releasable peripheral attachment apparatus connected thereto. The images, for example, may be captured by a camera driver feature of a releasable peripheral attachment apparatus connected to a wearable data collection device 106 or a camera driver feature of the wearable data collection device 106 itself. In a particular example, the camera driver I/O interface 1320b generates images from image data captured by the camera lens 1344 of the releasable peripheral attachment apparatus 1302, as illustrated in FIG. 13A. The images, in some example, may be captured continuously, periodically, and/or upon receipt of a software trigger. In a first example of a software trigger, a light sensor interface 1320a may receive light sensor data from light sensor 1342 and provide the light sensor data to a software algorithm which classifies one or more qualities of the light sensor data as being indicative of headlamps approaching the wearer of the wearable data collection device 106 from behind and triggers the camera driver I/O interface 1320b to capture images of the suspected approaching vehicle. Similarly, a noise sensor interface 1320a may receive noise data from one or more externally directed microphones 1342a, as illustrated in FIG. 13B, and provide the noise data to a software algorithm which classifies one or more qualities of the noise data as being indicative of a vehicle or individual approaching the wearer of the wearable data collection device 106 from behind and triggers the camera driver I/O interface 1320b to capture images of the suspected approaching threat. Further, a motion sensor interface 1320a may receive motion sensor data from one or more rear-facing motion sensors (e.g., via the motion sensor port 120b described in relation to FIG. 1B) and provide the motion sensor data to a software algorithm which classifies one or more qualities of the motion sensor data as being in indicative of a vehicle or individual approaching the wearer of the wearable data collection device 106 from behind and triggers the camera driver I/O interface 1320b to capture images of the suspected approaching threat. In another example, analysis of two or more sensor data sources may contribute to a software trigger (e.g., noise plus motion, light plus noise, etc.).

In some implementations, the one or more rear-facing camera images are compared to one or more previously received images (904). For example, an analysis algorithm executing on the peripheral control module 1320 of FIG. 13A, wearable data collection device, and/or a computing device communicatively networked thereto may analyze one or more newly collected images in view of one or more stored images (e.g., stored within a memory 1306 and/or a removable memory 1324 of the releasable peripheral attachment apparatus 1302) to identify one or more objects or individuals captured within the images. In another example, as the peripheral control module 1320 captures image data, the peripheral control module 1320 may share image data with a wearable data collection device 106 via the software application interface 1318a, and the wearable data collection device 106 may perform image analysis. Further, the camera interface 1320a may share collected image data with an external computing device via a communication module 1314 (e.g., using network controller 1314a to transmit image data via an internet connection 1336 or using an NFC controller 1314b to transmit image data to an NFC receiver 1338, etc.), and the networked computing device may perform image analysis.

In some implementations, if image comparison does not result in detection of an object approaching the wearer from behind (906), the method 900 continues to receive and review further image data (902). In other implementations, the method 900 may terminate and await receipt of a software trigger to perform additional image analysis.

If, instead, comparison results in detection of an object approaching the wearer from behind (906), in some implementations, the image data is analyzed to determine whether the approaching object is a human (or, optionally, a dog or other potentially threatening animal) (908). For example, form analysis, facial analysis, and/or movement analysis may be used to identify the approaching object as a person. In some implementations, identification of an approaching object as a human involves providing one or more still images and/or video snippets to a network-accessible analysis algorithm. For example, a cloud-based image analysis engine, accessible to the wearable data collection device 106 or the releasable peripheral attachment apparatus connected thereto via a wireless communication network, may communicate with the software algorithm performing the method 900 to review a video feed to identify a human approaching the wearer.

In some implementations, if comparison results in detection of an object approaching the wearer from behind (906), the image data is analyzed to determine whether the approaching object is moving at great speed (910). Speed analysis, for example, may identify wheeled vehicles such as a bicyclist, motorcyclist, car or truck. In further examples, speed analysis may identify flying shrapnel or other objects such as a baseball. Size comparison of objects captured by the camera images relative to time of capture, for example, may indicate speed of the approaching object.

In some implementations, if an individual and/or a high speed object is detected on a trajectory towards the wearer (908, 910), a rear-facing video feed is presented to the wearer of the wearable data collection device 106 (912). For example, the peripheral control module 1320 of the releasable peripheral attachment apparatus 1302 may supply the heads up display of a wearable data collection device 106 with a real time data feed via the wearable interface module 1318. Rather than a video feed (for example to preserve battery or processing power), in other implementations, one or more images may be presented to the user.

In some implementations, a determination is made whether the object is a threat (914). Identification of a threat, for example, may be based at least in part upon a nearness of the object. For example, an object on trajectory within thirty feet of the wearer may be less of an imminent threat than an object trajectory within ten feet of the wearer. If the object is a human, in some embodiments, the image data may be analyzed to identify whether a potential attacker is approaching the wearer. In some examples, gait, incident of approach, and/or facial expression may be further analyzed to discern a threat from a friendly passerby. For example, the movements and facial expression of an attacker may differ in recognizable ways from the movements of a jogger. As discussed above, in some embodiments a cloud-based image analysis engine may be configured to analyze behaviors of the human, such as facial analysis, gait analysis, and/or body language to identify potentially threatening behavior. In another example, the image analysis engine may be configured to analyze an identified human to identify one or more potential weapons upon the human's person. Further, the software algorithm of the method 900 and/or the cloud-based image analysis engine may consider one or more factors, such as time of day, additional traffic nearby, and/or current weather conditions in performing threat analysis. For example, a fast moving car thirty feet away on a dry road during a sunny day may be considered less threatening than a fast moving car thirty feet away in dark, rainy, and/or icy conditions.

If a threat is identified (914), in some implementations, at least one still image is collected of the threat (916). In the example of an oncoming vehicle, the still image may be captured to obtain a license plate. In the example of a potential attacker, the still image may be captured to obtain characteristics for use in later identification (e.g., facial features, tattoos, hair color, etc.). A software algorithm, for example, may be used to focus on particular features based upon the type of threat (e.g., license plate region vs. face region). In some implementations, infrared illumination (e.g., from infrared LEDs 1346 as described in relation to FIG. 13A) is used to take a night vision image of a suspected attacker without alerting the attacker to the image capture. In other implementations, flash LEDs 1346 may be used to obtain a clearer image of the imminent threat.

In some implementations, communications regarding the perceived threat are issued to one or more emergency contacts (918). For example, to separate the still image identification from the wearer in case of device damage or kidnapping, a copy of the still image may be provided to one or more remote locations (e.g., text to an emergency contact number, email to an emergency contact account, etc.). Further, a present location (e.g., derived from a positioning feature such as a GPS element 1322 of the releasable peripheral attachment apparatus illustrated in FIG. 13A), time, and/or nature of the threat may be provided in lieu of and/or in addition to the still image.

In some implementations, confirmation of emergency status is obtained (920). In a first embodiment, sensor data obtained from one or more sensors of the wearable data collection device 106 and/or the releasable peripheral attachment apparatus may be analyzed to identify injury to the wearer. For example, motion sensors may identify that the wearer has been struck or has fallen or that the wearable data collection device 106 has separated from the wearer. In another embodiment, the user may issue an emergency cue, such as a panic word or phrase received via one or more audio input elements (e.g., such as the microphones 1342 of the releasable peripheral attachment apparatus 1302 as illustrated in FIG. 13B) and analyzed using a voice recognition software algorithm, selection of a user input (e.g., via a touch or gesture command interface), or activation of a cuing mechanism accessible remotely from the wearable data collection device 106 (e.g., a panic button input available upon a wrist computing device, smart phone computing device, or other portable computing device external to the wearable data collection device).

If an emergency is confirmed (920), in some implementations, an emergency response routine is activated (922). The emergency response routine may collect data helpful in locating the wearer (e.g., in case of kidnapping), presenting evidence of an attack to authorities (e.g., in future litigation), and/or analyzing health conditions (e.g., to alert medical professionals to potential problems). Multiple emergency response routines may be applicable based upon the present circumstances. For example, video obtained prior to, during, and after the emergency situation (e.g., altercation, collision, etc.) may be supplied to a remote location for safe keeping and later review. Further, video may be issued in real time to a third party (e.g., a parent, caretaker, medical professional, or security professional) for analysis and response strategy. Should the wearer be removed from the scene (e.g., kidnapped), a tracking emergency response routine may place the wearable data collection device 106 is a power preservation pattern to extend battery as long as possible while issuing periodic communications regarding position and/or status of the individual. One emergency response routine may involve enabling an emergency call to local authorities, such as a 911 call for aid. In the event that the wearer is unconscious, the wearable data collection device 106 may "call" for aid within the immediate vicinity (e.g., via a speaker element of the wearable data collection device) and/or issue a report to emergency authorities including data regarding the emergency event. If the wearable data collection device 106 includes and/or is in communication with biometric sensors, an emergency response routine may involve obtaining biometric data regarding the health of the individual (e.g., heart rate and/or breathing rate data 1106e, EEG data 1106f, EMG data 1106i, temperature data 1106a or other biometric status data as described in relation to FIG. 11) and analyzing the biometric data to identify one or more potential health concerns.

Although described as a series of steps, in other implementations, the method 900 may be performed with one or more steps removed and/or one or more additional steps included. For example, in another embodiment, rather than collecting a still image of a threat (916), the method may be used to retain a video segment of a perceived threat. Further, if the wearer is already using the camera element for a rear-facing video feed (e.g., actively monitoring while bicycling or jogging, etc.), step 912 may be skipped or modified (e.g., drawing the wearer's attention to the rear-facing video feed, for example with a flashing indicator, audible alert, or other attention-grabbing output). In further implementations, steps of the method 900 may be performed in an order different than the one portrayed in FIG. 9A. For example, the method 900 may be altered to determine whether an object is moving at great speed (910) prior to identifying whether the object is human (908). In a further example, in some implementations, communicating with one or more emergency contacts regarding the perceived threat (918) may be part of the emergency response routine activated upon confirmation of a threat (922). Other modifications are possible while remaining within the scope and spirit of the method 900.

Figure 9B:
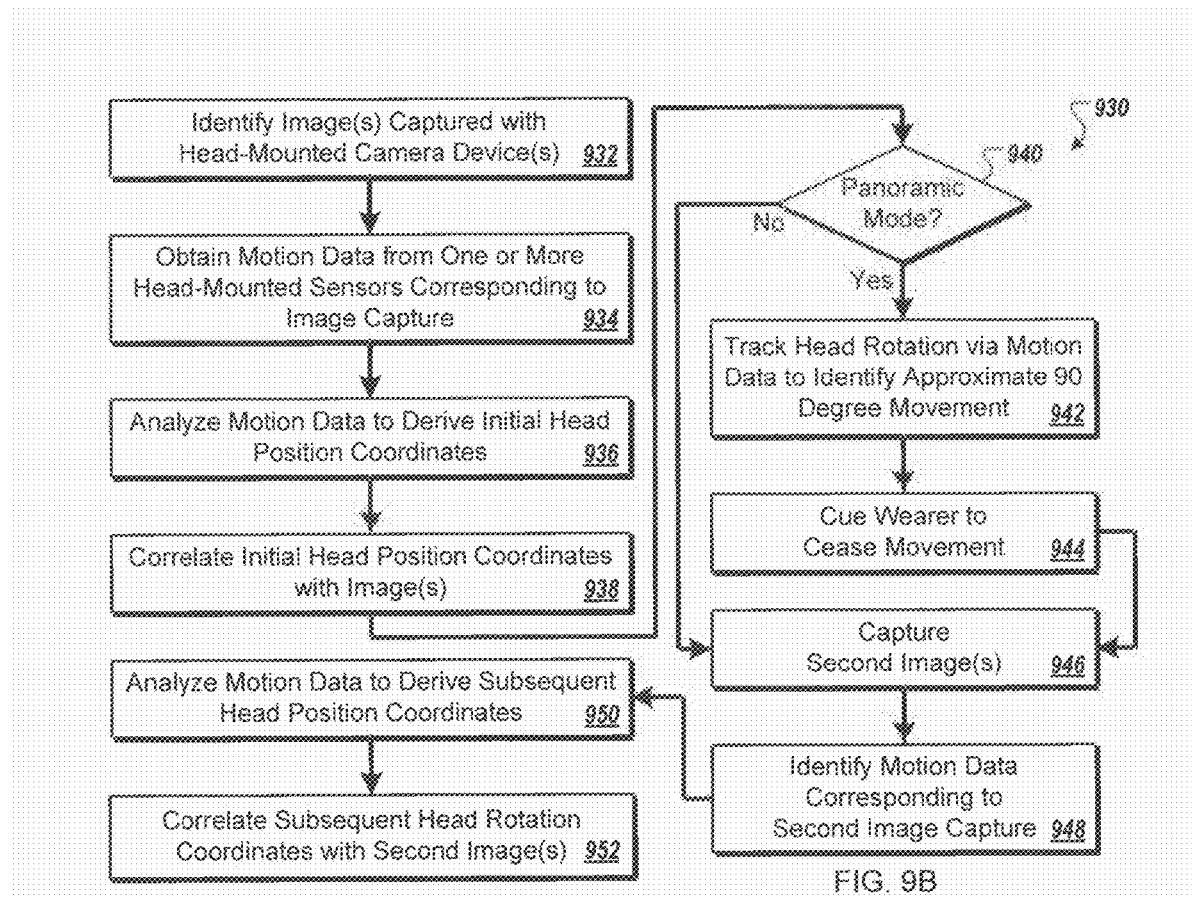
FIGS. 9B and 9C are flow charts of example method used for creating a panoramic or 360° image using a head-mounted camera device.

In some implementations, a head-mounted camera element, such as the camera feature of a wearable data collection device 106 such as Google Glass™, the rear view camera feature of the releasable peripheral attachment apparatus described in relation to method 900 of FIG. 9A or the antenna sensor feature 802 discussed in relation to FIG. 8A, may be used to create panoramic and 360° images. FIGS. 9A and 9B describe methods for producing panoramic and 360° images based upon motion data related to the head rotation of the wearer of a head-mounted camera device.

A flow chart of FIG. 9B illustrates an example method 930 for capturing images and corresponding head rotation coordinates using a head-mounted computing device with a camera feature. The head-mounted computing device may include two or more camera elements, such as a forward-facing camera element and a rear-facing camera element. For example, method 930 may be used with a wearable data collection device 106 having a forward-facing (e.g., wearer's viewpoint) camera element as well as a releasable peripheral attachment apparatus connected to the wearable data collection device 106 having a rear-facing camera element. Images captured using the method 930 may later be stitched together, based upon captured head position coordinates, to create panoramic, cylindrical, and/or semispherical images. At least portions of the method 930, for example, may be performed by a software algorithm executing upon the CPU 1308 of the releasable peripheral attachment apparatus 1302 of FIG. 13A. In another example, at least portions the method 930 may be performed by a software algorithm executing upon a wearable data collection device. Furthermore, in other embodiments at least portions of the method 900 may be performed by a software algorithm executing upon a computing device, such as a network server, smart phone, or other networked computing device in communication with a wearable data collection device 106 and/or the releasable peripheral attachment apparatus connected thereto.

In some implementations, the method begins with identifying the capture of one or more images by respective head-mounted camera device(s) (932). The images are captured at a first head position at approximately the same time. The images, for example, may be captured by a camera driver feature of a releasable peripheral attachment apparatus connected to a wearable data collection device 106 and/or a camera driver feature of the wearable data collection device 106 itself. In one example, the images may include a first image captured by a forward-facing camera and a second image captured by a rear-facing camera.

In some implementations, motion data corresponding to time of image capture is obtained from one or more head mounted sensors (934). For example, sensor data may be obtained from one or more accelerometers, gyroscopes, magnetometers, gravity sensors, and/or linear accelerometers positioned about the head of the wearer (e.g., connected to or otherwise in communication with a wearable data collection device). In a particular example, one or more sensor interfaces 1320a may derive sensor data from one or more motion sensors 1342 of the releasable peripheral attachment apparatus 1302 and supply the motion sensor data to a software algorithm executing the method 930. The data may be communicated, for example, to the CPU 1308 of the releasable peripheral attachment apparatus 1302, to a wearable data collection device 106 via the software application interface 1318a of the wearable interface module 1318, or to a remote computing device via the communication module 1314 (e.g., to NFC receiver9s) 1338 or via the internet 1336).

In some implementations, the motion data is analyzed to derive initial head position coordinates (936). Determining an initial head position of a wearer of a wearable data collection device, for example, may involve identifying a first measurement or measurement range of motion sensors as the initial head position. The initial head position coordinates may be used as a zeroing point for a coordinate system identifying relative rotation of the wearer's head during subsequent image capture by the camera element(s).

In some implementations, the initial head position coordinates are correlated with the captured image(s) (938). For example, the software algorithm may store the initial coordinates as a metadata portion of the image file (e.g., stored within a memory 1306 and/or a removable memory 1324 of the releasable peripheral attachment apparatus 1302, stored upon a non-transitory computer readable medium of the wearable data collection device, or stored upon a non-transitory computer readable medium accessible to the wearable data collection device 106 via a network connection). In another example, the software algorithm may store the initial coordinates as a database entry associated with the image file(s). The initial coordinates, in some embodiments, may further include an indication of a camera element used to capture at the initial coordinates (e.g., rear-facing vs. front-facing camera, etc.).

In some implementations, the method 900 includes an automated or semi-automated panoramic mode for capturing a set of images encompassing a cylindrical or semispherical (e.g., 360°) view of a vicinity surrounding the wearer of the wearable data collection device. If panoramic mode is activated (940), in some implementations, the head rotation of the wearer is tracked via subsequently collected motion data to identify an approximate 90° movement (942). For example, to obtain a 360° view of a vicinity surrounding the wearer, forward and rear facing cameras can obtain a first (forward/backward) set of images and a second (left/right) set of images, where the second set of images are captured while the wearer's head is rotated at approximately 90° offset from a neutral head position (e.g., looking along a left or right shoulder).

Upon identifying desired head rotation, in some implementations, the user is cued to cease movement (944). For example, for increase sharpness of image capture, the user may be prompted to remain still to allow the camera element(s) to focus prior to image capture. The cue, in some examples, may include one or more of a visual, audible, and/or haptic cue. In a particular example, the user may first be cued to turn her head via a directional arrow presented upon a heads up display region of the wearable data collection device. The directional arrow may change (e.g., shorten, shrink, etc.) based upon closeness to a goal head rotation. Upon reaching the desired head rotation, the wearer may be presented with a cue to halt movement (e.g., stop sign graphic, graphic indicating success of desired motion, etc.).

In some implementations, one or more second images are captured (946). If the method 930 is performed in automated panoramic mode, the method 930 may activate capture of the second image(s). For example, the software algorithm executing the method 930 may issue a command to the peripheral control module 1320 to activate image capture via the camera lens 1344 of the releasable peripheral attachment apparatus 1302 illustrated in FIG. 13. In other embodiments, the wearer may activate capture of the second image(s), for example via a user input mechanism of the wearable data collection device.

In some implementations, motion data corresponding to the second image capture is identified (948). For example, sensor data obtained from the one or more head-mounted sensors having a timestamp contemporaneous with capture of the second image(s) may be identified. The motion data, for example, may be obtained as described in relation to step 934.

In some implementations, the motion data is analyzed to derive subsequent head position coordinates (950). The motion data, for example, may be analyzed in light of the motion data corresponding to the initial head position coordinates to determine offset head position coordinates. In a particular example, the software algorithm may access image metadata of the first image(s) to identify initial positioning data (e.g., coordinates and/or sensor data corresponding to the initial head position). The software algorithm may determine an offset based upon the current motion data and the initial positioning data.

In some implementations, the subsequent head position coordinates are correlated with the second image(s) (952). The subsequent head position coordinates, for example, may be correlated with the second image(s) in the manner described in relation to step 938.

Although described as a series of steps, in other implementations, the method 930 may be performed with one or more steps removed and/or one or more additional steps included. For example, in another embodiment, rather than cuing the wearer to cease movement (944), the method 930 may automatically capture second image(s) (946) upon identifying the approximate 90° movement. In further implementations, steps of the method 930 may be performed in an order different than the one portrayed in FIG. 9B. For example, the method 930 may be altered to analyze motion data to derive initial head position coordinates (936) prior to identifying image(s) captured with the head-mounted camera device(s) (932). In a further example, in some implementations, if only one camera element is used, panoramic mode may involve iteratively tracking head rotation (942) and capturing images (946) to obtain a series of three or more images (e.g., front, right, back, left). Further, rather than obtaining a cylindrical rotation of the wearer's gaze, the method 930 may be modified to enable the user to obtain a bottom-to-top panoramic image (e.g., of a skyscraper, mountain, or other object encompassing greater neck tilt gaze rotation than a neutral head position). Other modifications are possible while remaining within the scope and spirit of the method 930.

Figure 9C:
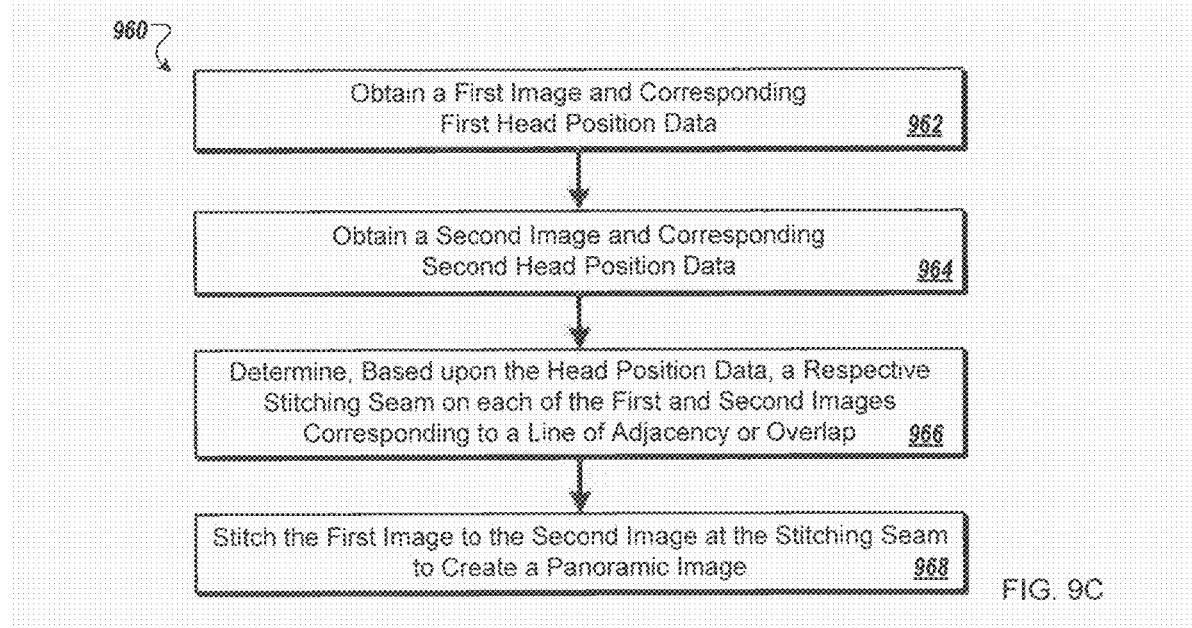

Turning to FIG. 9C, a flow chart illustrates an example method 960 for creating a panoramic, semispherical, or 360° image using a head-mounted camera device. The image, for example, may encompass at least a portion of a cylindrical or spherical view based upon two or more images captured during rotation of the head of the wearer of a head-mounted camera device. In one example, the images used by the method 960 were captured using the method 930 described in relation to FIG. 9B.

In some implementations, the method 960 begins with obtaining a first image and first head position data corresponding to capture of the first image (962). The first head position data, for example, may include sensor data from one or more motion sensors, such as one or more accelerometers, gyroscopes, magnetometers, gravity sensors, and/or linear accelerometers positioned about the head of the wearer (e.g., connected to or otherwise in communication with a wearable data collection device) measured at time of capture of the first image by a camera element connected to or otherwise in communication with a wearable data collection device. Additionally or conversely, the first head position data may include a set of coordinates derived through analysis of the sensor data. In a particular example, the first head position data may include coordinate data derived from sensor data collected by one or more sensor interfaces 1320a corresponding to one or more motion sensors 1342 of the releasable peripheral attachment apparatus 1302. The first head position data, for example, may identify a neutral position or initial position of the head of a wearer during capture of multiple images for generating a panoramic image. Further, the first head position data may identify an orientation of the camera upon the wearable data collection device 106 (e.g., a forward positioned camera element, a rear positioned camera element, an elevated antenna sensor 802 element, etc.). In some embodiments, the first head position data is supplied as a metadata portion of an image file.

In some implementations, a second image and second head position data corresponding to the capture of the second image are obtained (964). The second head position data is obtained in a similar manner as described in relation to step 964 and includes similar information. The second head position data, for example, may correspond to an offset from the first head position data. For example, the second head position data may be indicative of a rotation and/or tilt of the head of the wearer from the first head position.

In some implementations, a respective stitching seam is determined on each of the first and second images based upon the first and second head position data (966). The respective stitching seams, for example, may correspond to a line of adjacency or overlap between the first image and the second image. For example, based upon an angle of rotation from the first head position and a scope of the camera element used to capture the images, a point of adjacency or overlap may be identified. In some implementations, if no adjacency is identified, the method 960 may exit with an error (e.g., images unable to be used to produce a panoramic image).

In some implementations, the second image is captured with a different camera element than the first image. For example, to obtain a 360° view of a vicinity surrounding the wearer, forward and rear facing cameras can obtain a first (forward/backward) set of images and a second (left/right) set of images, where the second set of images are captured while the wearer's head is rotated at approximately 90° offset from a neutral head position (e.g., looking along a left or right shoulder). In this circumstance, to stitch the an image captured by the forward positioned camera to an image captured by the rear positioned camera, if the two camera elements capture different scope images the differing image scope can be factored in to determine a stitching seam.

In some implementations, the first image is stitched to the second image at the stitching seam to create a panoramic image (968). The panoramic image, for example, may be generated using panoramic image generation techniques known in the art.

Figure 10:
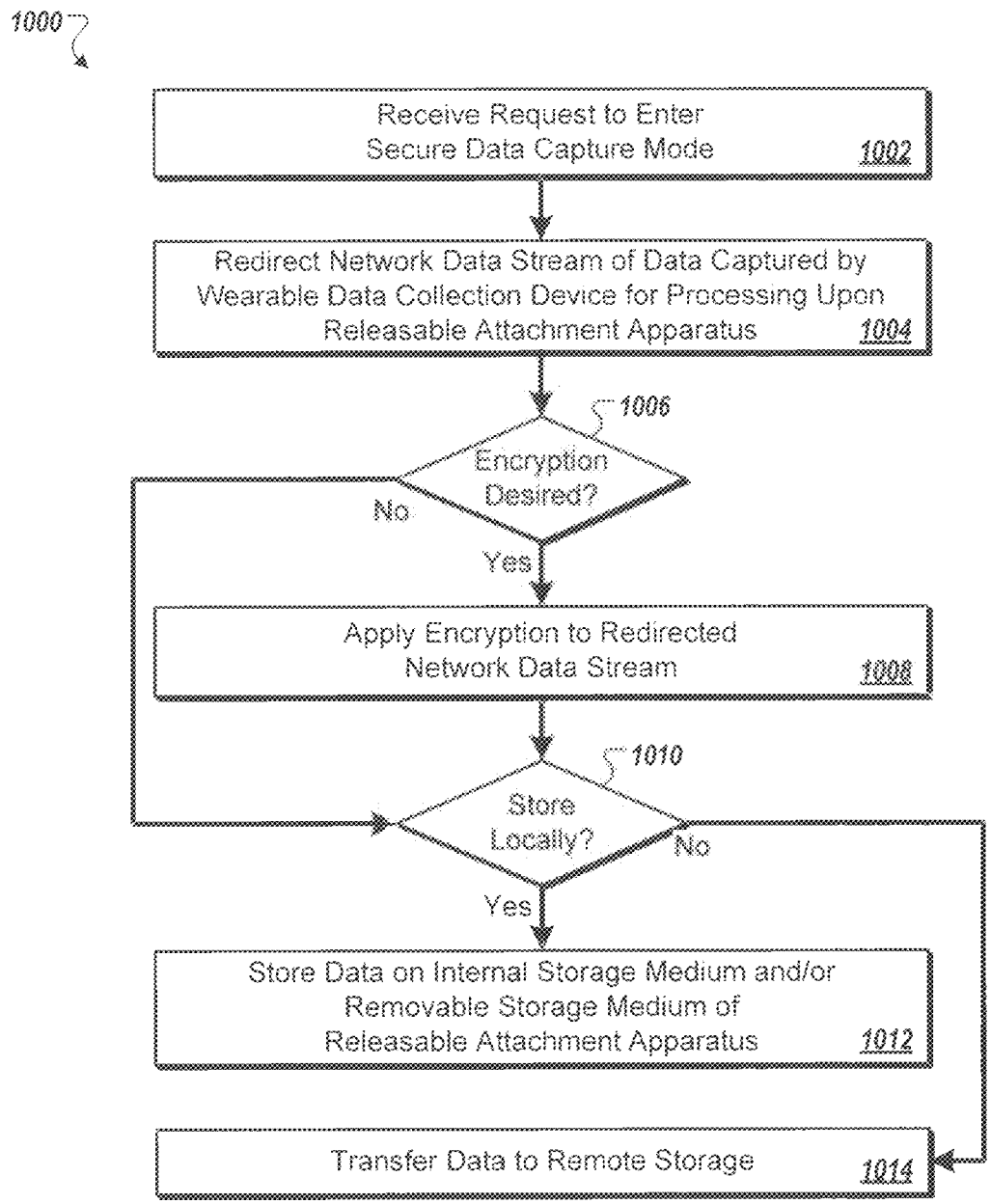
FIG. 10 is a flow chart of an example method for capturing and storing secure data using a wearable data collection device 106 with a releasable peripheral attachment apparatus.

FIG. 10 is a flow chart of an example method 1000 for capturing and storing secure data using a wearable data collection device 106 with a releasable power attachment apparatus. Through the method 1000, a default network upload mechanism on a wearable data collection device 106 may be intercepted, allowing the wearable data collection device 106 to encrypt collected data and/or store the data locally rather than allowing the data to be transmitted to a remote cloud storage location. The method 1000, in a particular example, may be used to bypass the standard data sharing mechanism of a Google Glass™ device, allowing a medical professional to utilize the Google Glass device during a patient procedure without compromising patient privacy.

In some implementations, the method 1000 begins with receiving a request to enter a secure data mode (1002). The request, in some embodiments, may be issued by a software application designed for functionality with the secure data mode algorithm. Upon entering the software application, for example, any data collected via input elements of the wearable data collection device 106 may be directed to the method 1000 by launching the secure data capture mode from within the application. In a particular example, a software application may be designed for medical professionals to support an operating room video conferencing session with a remote specialist or remotely located trainees. In other embodiments, the user may activate a control to enter secure data capture mode separate from any particular software application executing at the time of or subsequent to issuance of the request to enter secure data capture mode. For example, a researcher working on a classified project may enter secure data capture mode to collect images and audible notes regarding an experiment without allowing the data to upload to a remote cloud-based storage network.

In some implementations, while in secure data capture mode, a network data stream of data captured by the wearable data collection device 106 is redirected for processing upon a releasable attachment apparatus (1004). A data connection established between the releasable attachment apparatus and the wearable data collection device, for example, may be used to redirect the data stream from the wearable data collection device 106 to the releasable attachment apparatus. The connection, in some examples, may include a USB interface such as a USB port interface 1316 of the releasable peripheral attachment apparatus 1302 illustrated in FIG. 13A, a near field communication interface such as the NFC controller 1314b of the releasable peripheral attachment apparatus 1302, or a wireless network interface such as the network controller 1314a of the releasable peripheral attachment apparatus 1302. The data stream, in a particular example, may be captured by the I/O capture interface 1318b of the wearable interface module 1318 of the releasable peripheral attachment apparatus 1302 via a USB connection between USB receiver(s) 1340 of the wearable data collection device 106 and the USB port interface 1316 of the releasable peripheral attachment apparatus 1302. The I/O capture interface 1318b, for example, may override or spoof an I/O data stream receiver of the wearable data collection device.

In some implementations, if encryption is desired (1006), encryption is applied to the redirected network data stream (1008). A request for encryption, for example, may be received along with the request to enter secure data capture mode. In other embodiments, encryption may be activated through a general user setting or, in further embodiments, data encryption may always be activated as a standard element of the method 1000. The method 1000 may use any encryption scheme known in the art such as, in some examples, a symmetric key encryption algorithm, a public key encryption algorithm, file-based encryption algorithm, storage region encryption algorithm, and/or other data cipher mechanism.

In some implementations, it is determined whether the data is to be stored locally (1010). Similar to the decision regarding data encryption, in some embodiments, a request for redirection to a particular storage location may be received along with the request to enter secure data capture mode. In other embodiments, a default storage location may be activated through a general user setting or, in further embodiments, a particular storage location, may automatically be activated as a default (or hard-coded) storage location of the method 1000.

If the data is to be stored locally (1010), in some implementations, the data is stored on an internal storage medium and/or a removable storage medium of the releasable attachment apparatus (1012). In some examples, the local storage medium may include a removable storage medium (e.g., a removable SIM 1326 or other removable memory 1324 of the releasable peripheral attachment apparatus 1302 of FIG. 13A), or a built in memory location of the releasable attachment apparatus (e.g., the memory 1306 of releasable peripheral attachment apparatus 1302).

If, instead, the data is to be stored remotely (1010), in some implementations, the data is transferred to a remote storage medium (1014). For example, the data may be transferred by a communication module of the releasable attachment apparatus to an external storage location in wired or wireless communication with the releasable attachment apparatus. In some examples, the remote storage location may be a network accessible memory (e.g., accessible via a network connection such as the Internet 1336 as illustrated in FIG. 13A), a near field communication accessible memory (e.g., accessible via a near field communication link as provided by the NFC receiver(s) 1338 in communication with the communication module 1314 of releasable peripheral attachment apparatus 1302 of FIG. 13A), or a USB tethered storage medium or external computing device (e.g., connected to the releasable attachment apparatus via a USB port interface such as the USB port interface 1316 of the releasable peripheral attachment apparatus 1302).

Figure 12:
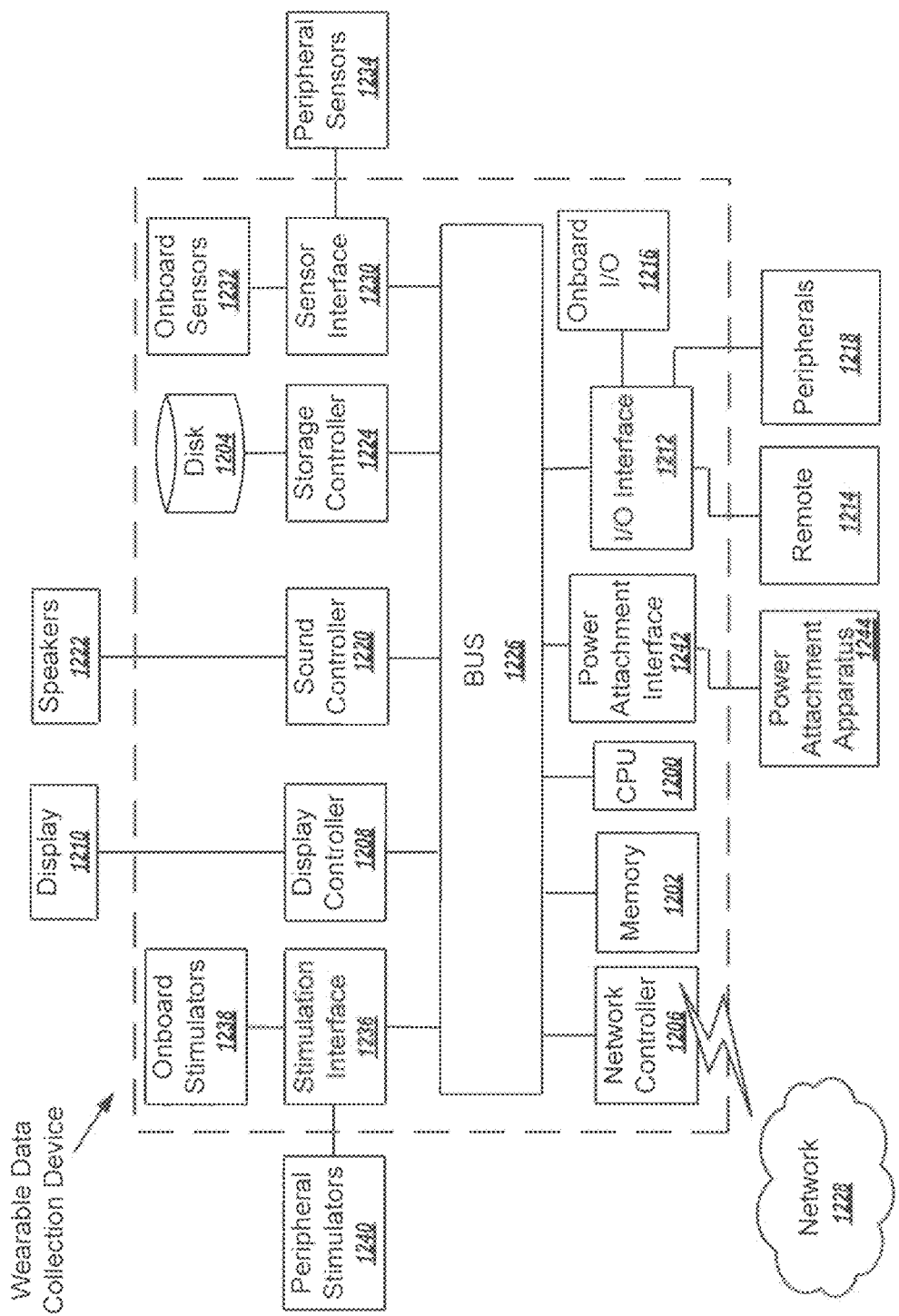
FIG. 12 is a block diagram of an example wearable computing device.

Although described as a series of steps, in other implementations, the method 1000 may be performed with one or more steps removed and/or one or more additional steps included. For example, in another embodiment, if secure data capture mode is launched (1002) outside of a software application designed for interaction with the secure data capture mode algorithm, the method 1000 may issue a warning to the user that some functionality may be lost. For example, a software application that executes a portion of its functionality upon a remote server may fail to function properly if data needed by the remote server is intercepted by the secure data capture mode. In some implementations, in addition to requesting to enter secure data capture mode (1002), a user may select particular data stream(s) for redirection (1004) in secure data capture mode (e.g., image data, voice data, etc.). In this manner, external (e.g., cloud-based) data processing can remain supported within software applications not designed to function with the method 1000. Additionally, in some implementations, rather than or in addition to encrypting the data stream, the method 1000 may reformat the data stream into a preferred data format. In the example of hospital use, patient data may be reformatted into DICOM format and securely encrypted for interoperation with a medical facility's DICOM network. In further implementations, steps of the method 1000 may be performed in an order different than the one portrayed in FIG. 10. For example, data encryption (1008) may occur at time of data storage (1012) on a locally accessible storage medium or applied upon the storage region after data has been initially transferred to the local storage region. Additionally, the method 1000 may be altered to store data in both a local storage medium and a remote storage medium. In a first example, data may be replicated on both the local storage medium and the remote storage medium. In a second example, data may be temporarily stored on a local storage medium and transferred in batch mode to the remote storage medium. Depending upon network configuration, user settings, and/or type of remote storage device, encryption and/or reformatting of the data stream may differ for storage at each of the remote and the local storage locations. Other modifications are possible while remaining within the scope and spirit of the method 1000. Next, a hardware description of the wearable data collection device 106 according to exemplary embodiments is described with reference to FIG. 12. In FIG. 12, the wearable data collection device 106 includes a CPU 1200 which performs a portion of the processes described above. The process data and instructions may be stored in memory 1202. These processes and instructions may also be stored on a storage medium disk 1204 such as a portable storage medium or may be stored remotely. In some examples, the portable storage medium may be a Secure Digital (SD) memory device by developed by the SD Association, CompactFlash, MultiMediaCard (MMC) developed by the JEDEC Solid State Technology Association (JEDEC), or universal serial bus (USB) FLASH memory drive Further, the claimed advancements are not limited by the form of the computer-readable media on which the instructions of the inventive process are stored. For example, the instructions may be stored on FLASH memory, RAM, ROM, PROM, EPROM, EEPROM, SSD disk or any other information processing device with which the wearable computing system communicates, such as a server or computer.

Further, components of the claimed advancements may be provided as a utility application, background daemon, or component of an operating system, or combination thereof, executing in conjunction with CPU 1200 and an operating system such as Microsoft Windows 7, UNIX, Solaris, LINUX, Apple MAC-OS and other systems known to those skilled in the art.

CPU 1200 may be a mobile or embedded processor from Intel of America or from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The wearable computing system in FIG. 12 also includes a network controller 1206, such as from Intel Corporation of America, for interfacing with network 1228. As can be appreciated, the network 1228 can be a public network, such as the Internet, or a private network such as an LAN or WAN network, or any combination thereof and can also include PSTN or ISDN sub-networks. The network 1228 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The wearable data collection device 106 further includes a display controller 1208, such as an adaptor from NVIDIA Corporation of America for interfacing with display 1210, such as a remotely located display or a heads up display. A general purpose I/O interface 1212 interfaces with an input device. General purpose I/O interface can also communicate with a variety of on board I/O devices 1216 and/or peripheral I/O devices 1218 including, in some examples, a video recording system, audio recording system, microphone, gyroscopes, accelerometers, gravity sensors, linear accelerometers, global positioning system, magnetometers, EEG, EMG, EKG, bar code scanner, QR code scanner, RFID scanner, temperature monitor, skin dynamics sensors, scent monitor, light monitor, blood dynamics and chemistry monitor, vestibular dynamics monitor, external storage devices, and external speaker systems.

A sound controller 1220 is also provided in the wearable data collection device, such as Sound Blaster X-Fi Titanium from Creative, to interface with speakers/microphone 1222 thereby both recording and presenting sounds to the wearer.

The general purpose storage controller 1224 connects the storage medium disk 1204 with communication bus 1226, which may be an ISA, EISA, VESA, PCI, or similar, for interconnecting all of the components of the wearable computing system. A description of the general features and functionality of the display 1210, as well as the display controller 1208, storage controller 1224, network controller 1206, sound controller 1220, and general purpose I/O interface 1212 is omitted herein for brevity as these features are known.

The wearable data collection device 106 in FIG. 12, in some embodiments, includes a sensor interface 1230 configured to communicate with one or more onboard sensors 1232 and/or one or more peripheral sensors 1234. The onboard sensors 1232, for example, can be incorporated directly into the internal electronics and/or a housing of the wearable device. The peripheral sensors 1234 can be in direct physical contact with the sensor interface 1230 e.g. via a wire; or in wireless contact e.g. via a Bluetooth, Wi-Fi or NFC connection. Alternatively, one or more of the peripheral sensors 1234 may communicate with the sensor interface 1230 via conduction through the body tissue or via other mechanisms. Furthermore, one or more peripheral sensors 1234 may be in indirect contact e.g. via intermediary servers or storage devices that are based in the network 1228; or in (wired, wireless or indirect) contact with a signal accumulator somewhere on or off the body, which in turn is in (wired or wireless or indirect) contact with the sensor interface 1230. The peripheral sensors 1234 can be arranged in various types of configurations relative to the body. For instance, they can be mounted on the body, near the body, looking at the body, and/or implanted within the body of a human or animal subject. The onboard sensors 1232 and/or peripheral sensors 1234 can include, in some examples, one or more microphones, bone-conduction microphones, physiological events microphones, cameras, video cameras, high-speed cameras, temperature monitors, accelerometers, gyroscopes, magnetic field sensors, magnetic compasses, tap sensors and/or vibration sensors—internal or external to a gyroscope/accelerometer complex, infrared sensors or cameras, and/or eye-tracking cameras or eye-tracking sensor complex. In further examples, onboard sensors 1232 and/or peripheral sensors 1234 may include one or more skin-mounted electrodes, body-proximal electrodes (contact or non-contact), pulse oximetry devices, laser and laser-light sensors, photodiodes, galvanic skin response sensor modules, RF or other electromagnetic signal detectors, electrical signal pre-amplifiers, electrical signal amplifiers, electrical signal hardware filter devices, chemical sensors, and/or artificial noses.

A group of sensors communicating with the sensor interface 1230 may be used in combination to gather a given signal type from multiple places such as in the case of EEG or skin temperature in order to generate a more complete map of signals. One or more sensors communicating with the sensor interface 1230 can be used as a comparator or verification element, for example to filter, cancel, or reject other signals. For instance, a light sensor can pick up ambient light or color changes and use them to subtract or otherwise correct light-based signals from a camera pointed at the eye or skin to pick up small color or reflectance changes related to physiological events. Likewise, a microphone mounted against the body can pick up internal sounds and the voice of the subject donning the wearable data communication device and subtract the internal sounds from ambient sounds such as the voice of a separate individual or noise from environmental events, in order to more concentrate on the audible features of external events. Conversely, sensor data may be used to subtract environmental noise from body-internal sound signatures that can give evidence of physiology. Similarly, the input of multiple temperature monitors can aid in adjusting for major changes in ambient temperature or for narrowing a temperature signature to more narrowly identify the temperature of a particular element (e.g., device/electronics temperature or body temperature) without contamination from heat provided by other elements.

The wearable data collection device 106 in FIG. 12, in some embodiments, includes a stimulation interface 1236 for supplying stimulation feedback to a subject donning the wearable data collection device. The stimulation interface 1236 is in communication with one or more onboard stimulators 1238 and/or peripheral stimulators 1240 configured to deliver electrical pulses to the subject, thereby altering physiological conditions of the subject. For example, one or more onboard stimulators 1238 and/or peripheral stimulators 1240 may be situated and/or configured to electrically stimulate heart rate or breathing or brain waves at particular frequencies. The onboard stimulators 1238 and/or peripheral stimulators 1240 can be mounted on or near the body, and/or implanted within the body, and can include components that are external and others that are internal to the body which are all in communication with each other. In some examples, onboard stimulators 1238 and/or peripheral stimulators 1240 can include one or more of electrical signal generators and stimulation (output) electrodes, vibrator devices, heat-imparting devices, heat-extraction devices, sound generators/speakers, electromagnets, lasers, LEDs and other light sources, drug administering devices, brain stimulation or neural stimulation devices, gene transcription or expression modulation system, and/or pain or sensory stimulation generators.

The wearable data collection device 106 of FIG. 12, in some implementations, includes a power attachment interface 1242 for interfacing with a peripheral attachment apparatus 1244. The power attachment interface 1242, for example, may include a power supply port or connector for receiving a power supply from the power attachment apparatus 1244. Further, the power attachment interface 1242 may include a data port or connector for enabling data communications between the wearable data collection device 106 and the releasable peripheral attachment apparatus 1244. For example, both data and power may be communicated through a micro USB style power attachment interface 1242.

FIG. 13A is a block diagram of a system 1300 including an example computing system 1302 for a releasable peripheral attachment apparatus 1302.

FIG. 13B is a block diagram 1360 of the computing system 1302 of FIG. 13A configured with audio enhancement components.

Figure 13C:
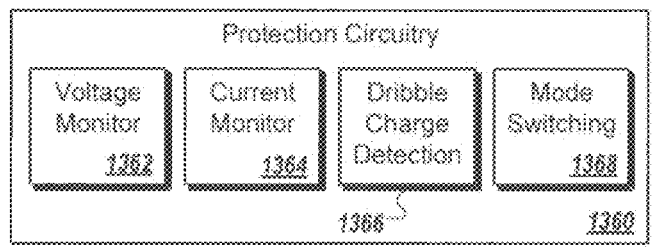
FIG. 13C is a block diagram of example power protection components of the releasable peripheral attachment apparatus of FIG. 13A.

FIG. 13C is a block diagram of example power protection components of the computing system of FIG. 13A. charge controlling and power protection are implemented according to known methods.

Figure 13D:
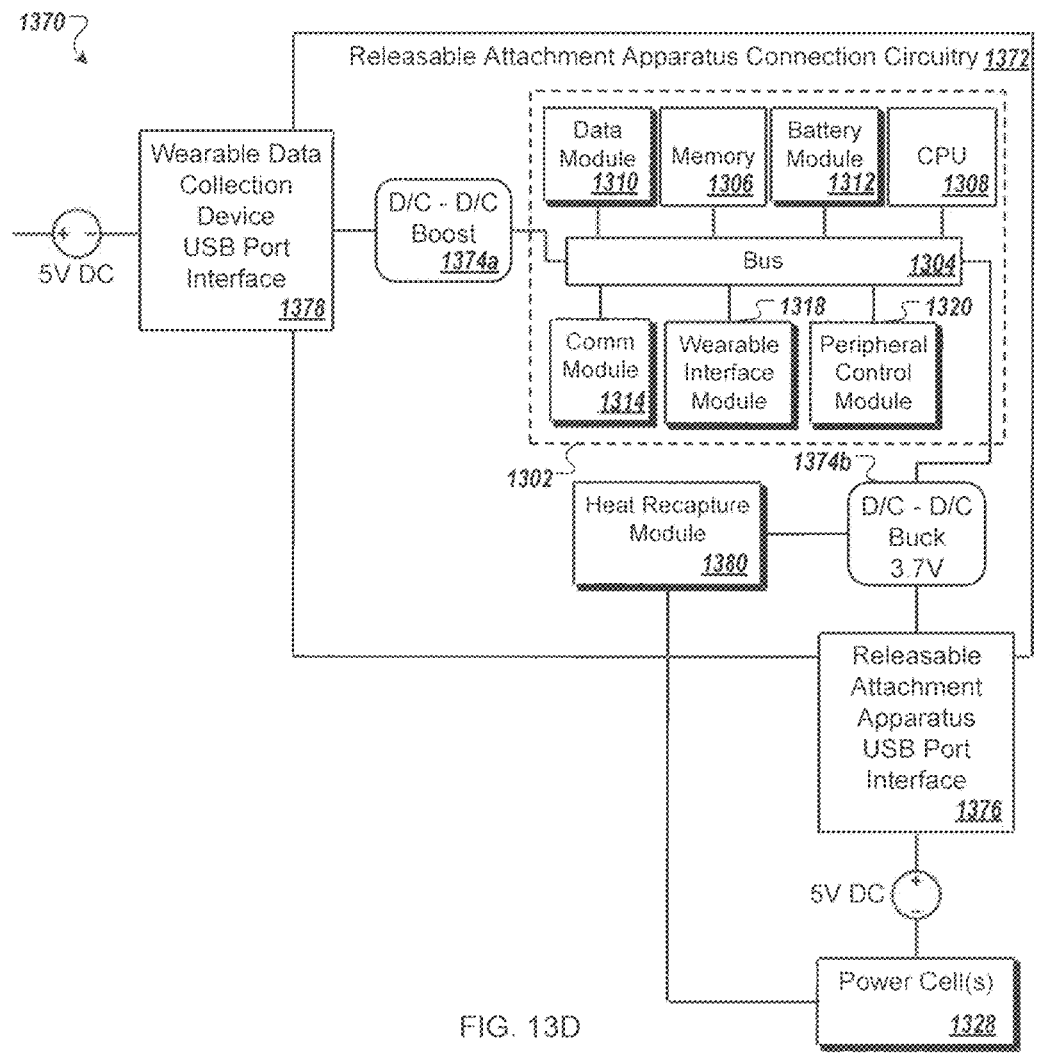
FIG. 13D is a block diagram of an example power distribution system of the releasable peripheral attachment apparatus of FIG. 13A.

FIG. 13D is a block diagram of an example power distribution system of a releasable power attachment apparatus FIG. 14 is a block diagram of a USB port splitter for use with a releasable power attachment apparatus. A PCB arranges two or more female USB ports and the male USB coupling and implements a USB host controller and hub, and multiplexes the signals passing through. The system allows for multiple charge speeds/currents including <500 mA, 1.0A, and 2.1A, and allows for concurrent data and power transmission when below 500 mA. This can be hard switched or softswitched, for each port.

Figure 11:
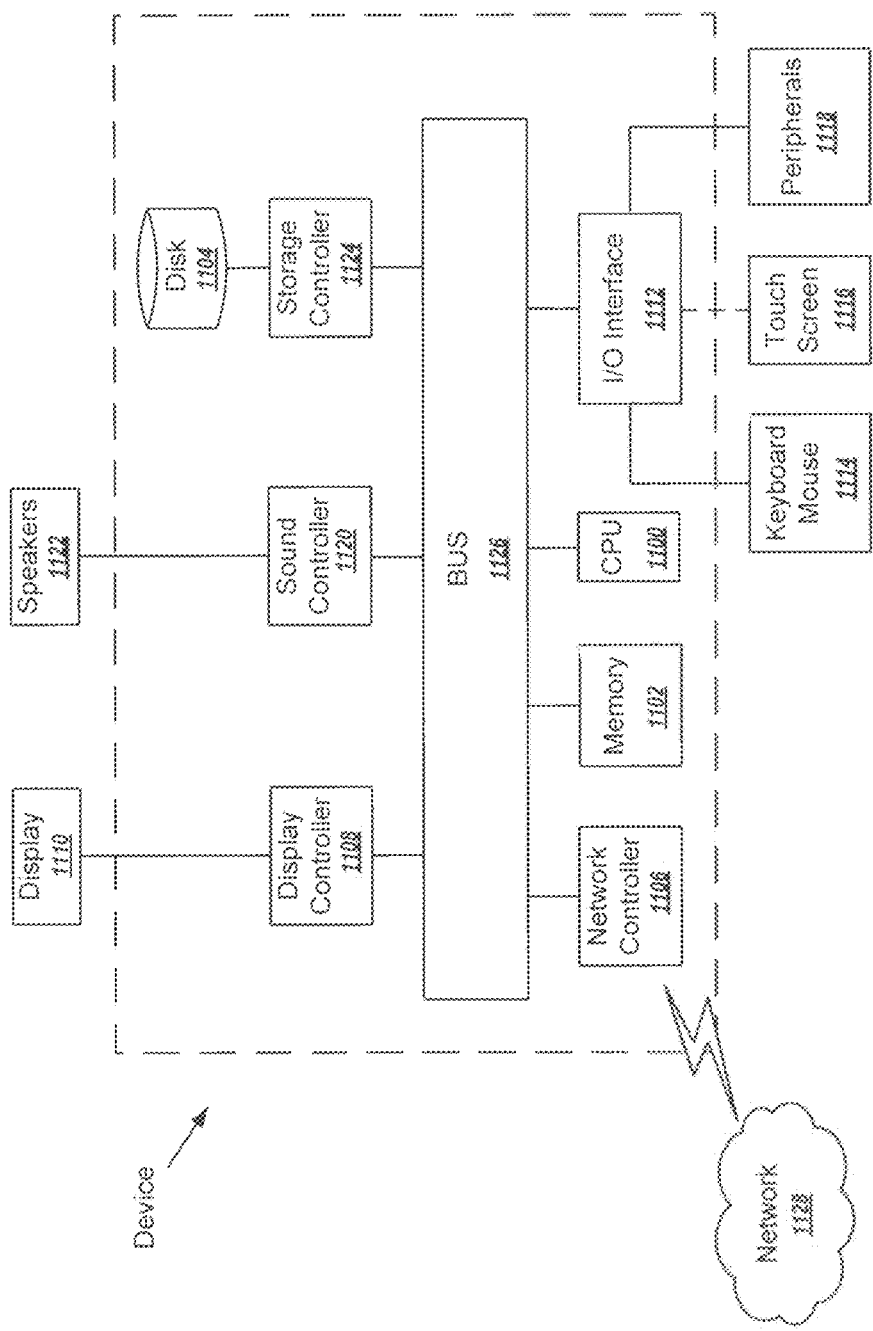
FIG. 11 is a block diagram of an example computing system.

Next, a hardware description of the computing device, mobile computing device, or server according to exemplary embodiments is described with reference to FIG. 11. In FIG. 11, the computing device, mobile computing device, or server includes a CPU 1100 which performs the processes described above. The process data and instructions may be stored in memory 1102. These processes and instructions may also be stored on a storage medium disk 1104 such as a portable storage medium or may be stored remotely. Further, the claimed advancements are not limited by the form of the computer-readable media on which the instructions of the inventive process are stored. For example, the instructions may be stored on in FLASH memory, RAM, SSD, ROM, PROM, EPROM, EEPROM, or any other information processing device with which the computing device, mobile computing device, or server communicates, such as a server or computer.

Further, a portion of the claimed advancements may be provided as a utility application, background daemon, or component of an operating system, or combination thereof, executing in conjunction with CPU 1100 and an operating system such as Microsoft Windows 10, UNIX, Solaris, LINUX, Apple MAC-OS and other systems known to those skilled in the art.

CPU 1100 may be a mobile/embedded-systems processor from Intel of America or from AMD of America, or may be other processor types that would be recognized by one of ordinary skill in the art. Alternatively, the CPU 1100 may be implemented on an FPGA, ASIC, PLD, SOC or using discrete logic circuits, as one of ordinary skill in the art would recognize. Further, CPU 1100 may be implemented as multiple processors cooperatively working in parallel to perform the instructions of the inventive processes described above.

The computing device, mobile computing device, or server in FIG. 11 also includes a network controller 1106, such as an Intel network interface card from Intel Corporation of America, for interfacing with network 1128. As can be appreciated, the network 1128 can be a public network, such as the Internet, or a private network such as an LAN or WAN network, or any combination thereof and can also include PSTN or ISDN sub-networks. The network 1128 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The computing device, mobile computing device, or server further includes a display controller 1108, such as a from NVIDIA Corporation of America for interfacing with display 1110. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard.

11 11 The general purpose storage controller 1124 connects the storage medium disk 1104 with communication bus 1126, which may be an ISA, EISA, VESA, PCI, or similar, for interconnecting all of the components of the computing device, mobile computing device, or server. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The invention claimed is:

1. An apparatus for providing an external power supply to a head-mounted wearable data collection device, comprising:
  a first portion comprising
    a first data port interface configured for connection to a corresponding data port interface of the head-mounted wearable data collection device;
  a second portion comprising
    an internal data port interface configured for connection to a corresponding internal data port interface of the first portion,
    a power cell module, and
    a power supply interface configured for connection to a corresponding power supply input of the head-mounted wearable data collection device; wherein
    the first portion releasably connects to the head-mounted wearable data collection device, and the second portion releasably connects to the first portion; and
  control logic circuitry comprising interface logic for receiving data via the first data port interface, and command logic for issuing commands to the head-mounted data collection device.

2. The apparatus of claim 1, further comprising a memory port configured to releasably receive a removable memory device, wherein the control logic circuitry comprises storage controller logic for storing data received via the first data port interface to the removable memory device.

3. The apparatus of claim 2, wherein the first portion comprises the memory port.

4. The apparatus of claim 2, wherein the control logic circuitry comprises data encryption logic for encrypting data received via the first data port interface.

5. The apparatus of claim 1, wherein
  the second portion comprises an image capture module; and
  the command logic comprises application logic for presenting image data captured by the image capture module upon a display of the head-mounted wearable portable data collection device.

6. An apparatus for providing energy to a portable data collection device, comprising:
  an energy sensor for capturing light energy signals usable to generate a panoramic image, the energy sensor comprising
    a plurality of conductive elements,
    a first substrate for arranging first ends of the conductive elements within a three-dimensional geometric shape and for fixing a location of each of the first ends, wherein
      the plurality of conductive elements are arranged to point in a plurality of directions, and
    a second substrate for arranging opposite ends of each conductive element of the plurality of conductive elements, wherein the opposite ends are separated and arranged in a pattern;
  a signal transfer interface configured for releasable connection to a corresponding signal transfer interface of the portable data collection device, the signal transfer interface being configured to transfer at least one of the light energy signals and data derived therefrom from the second substrate to the portable data collection device;
  a power cell module;
  a power supply interface configured for connection to a corresponding power supply input of the portable data collection device; and
  control logic circuitry comprising charging logic for managing recharging of the power cell module;
  wherein the portable data collection device is configured to generate the panoramic image using the captured light energy signals.

7. The apparatus of claim 6, wherein the control logic circuitry comprises application logic for presenting image data captured by the energy sensor upon a display of the portable data collection device.

8. The apparatus of claim 7, wherein image data captured by the energy sensor is presented as video to the display.

9. The apparatus of claim 6, wherein the control logic circuitry comprises communication logic for issuing wireless data communications.

10. The apparatus of claim 9, wherein the communication logic comprises a near field communication controller.

11. The apparatus of claim 9, wherein the communication logic comprises a network controller for communicating with a communications network.

12. The apparatus of claim 11, further comprising an integrated circuit port configured to receive a removable integrated circuit.

13. The apparatus of claim 12, wherein:
  the removable integrated circuit is a subscriber identification module (SIM) device; and
  the communications network is a mobile telephony network.

14. The apparatus of claim 6, wherein the charging logic comprises dribble charge detection logic.

15. The apparatus of claim 6, wherein the charging logic comprises mode switching logic for altering a charging mode of the apparatus, wherein the charging mode comprises a power only mode and a power plus data mode.

16. The apparatus of claim 6, further comprising at least one solar collection module, wherein the charging logic comprises solar charging logic.

17. The apparatus of claim 6, further comprising an induction charge module, wherein the charging logic comprises induction charging logic.

18. The apparatus of claim 6, further comprising a piezoelectric module, wherein the charging logic comprises heat recapture logic.

19. The apparatus of claim 6, wherein the portable data collection device comprises a head-mounted display.

20. The apparatus of claim 6, wherein the signal transfer interface transfers signals to a camera module of the portable data collection device.

21. The apparatus of claim 6, wherein transferring signals from the second substrate to the portable data collection device comprises transferring data derived from light energy signals collected by the plurality of conductive elements.

22. The apparatus of claim 6, wherein the plurality of light-conductive elements comprise optical fibers.

23. The apparatus of claim 6, wherein at least one of the first ends and second ends of the plurality of light-conductive elements are separated into at least two spatially distinct groupings.

24. The apparatus of claim 23, wherein a first spatially distinct grouping of the at least two spatially distinct groupings is configured to provide illumination and a second spatially distinct grouping of the at least two spatially distinct groupings is configured to capture the image.

25. The apparatus of claim 24, wherein the illumination comprises infrared light.

26. The apparatus of claim 6, wherein the light energy includes visible light.

27. A system comprising:
a releasable power attachment apparatus configured to supply power to a portable data collection device, wherein the releasable power attachment apparatus comprises
   a data port interface configured for connection to a corresponding data port interface of the portable data collection device,
   a power cell module,
   a power supply interface configured for connection to a corresponding power supply input of the portable data collection device, and
   a light energy sensor comprising
      a plurality of light-conductive elements to conduct light energy signals from a first location to a second location; and
      an optically transmissive substrate for enclosing first ends of the plurality of light-conductive elements at the first location, the first ends being fixed within a three-dimensional geometric shape, wherein
         the respective end of each light-conductive element is disposed proximate to a surface of the optically transmissive substrate, and
         the plurality of light-conductive elements are arranged to point in a plurality of directions;
a processor;
a memory having instructions stored thereon, wherein the instructions, when executed by the processor, cause the processor to
   receive, from the light energy sensor, sensor data including a scrambled pattern of light energy received from the plurality of light-conductive elements, and
   transform the scrambled pattern of the light energy to a panoramic image; and
a projection module for projecting light energy via the plurality of light-conductive elements, wherein the plurality of light-conductive elements are further configured to conduct light in both directions.

28. The system of claim 27, further comprising an unwinding zone at the second location, wherein:
the respective opposite ends of each light-conductive element of the plurality of light-conductive elements are separated and arranged in a pattern at the unwinding zone for supplying light energy to an image sensor; and
the scrambled pattern of the light energy is presented at the unwinding zone.

29. The system of claim 28, further comprising a terminal substrate disposed between the unwinding zone and the image sensor, wherein the terminal substrate fixes a location of the opposite end of each light-conductive element of the plurality of light-conductive elements along a surface.

30. The system of claim 28, wherein:
an image sensor comprises the processor; and
the light energy sensor further comprises a conductive stalk, wherein the unwinding zone is disposed between the conductive stalk and the image sensor.

31. The system of claim 30, further comprising a telescoping arm surrounding the conductive stalk, wherein the telescoping arm is configured to extend and retract the optically transmissive substrate from a mounting location on the portable data collection device.

32. The system of claim 27, wherein the optically transmissive substrate comprises a flexible material.

33. The system of claim 27, wherein the optically transmissive substrate is curved.

34. The system of claim 27, wherein the optically transmissive substrate comprises a lens array, wherein the respective end of each light-conductive element of the plurality of light-conductive elements is presented at a respective lens of at least two lenses of the lens array.

35. The system of claim 27, wherein the panoramic image represents at least a portion of a sphere.

36. The system for claim 27, wherein the plurality of light-conductive elements comprise optical fibers.

37. The system of claim 27, wherein at least one of the first ends and second ends of the plurality of light-conductive elements are separated into at least two spatially distinct groupings.

38. The system of claim 27, wherein the light energy includes visible light.

39. The system of claim 27, wherein the portable data collection device comprises a head-mounted display.

* * * * *